United States Patent
Bloy et al.

(10) Patent No.: US 11,875,375 B2
(45) Date of Patent: *Jan. 16, 2024

(54) MODIFYING EXISTING INSTRUMENTS WITHOUT MODIFICATION OF UNIQUE IDENTIFIER AND IMMEDIATE BENEFIT AVAILABILITY

(71) Applicant: The Toronto-Dominion Bank, Toronto (CA)

(72) Inventors: Adrian Bloy, Ottawa (CA); Daniel Lam Tin Cheung, Richmond Hill (CA); Asgar Maleki, Toronto (CA); Michael James Taggart, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,463

(22) Filed: Mar. 25, 2022

(65) Prior Publication Data

US 2022/0222699 A1    Jul. 14, 2022

Related U.S. Application Data

(63) Continuation of application No. 16/596,004, filed on Oct. 8, 2019, now Pat. No. 11,315,136, which is a (Continued)

(51) Int. Cl.
*G06Q 30/02* (2023.01)
*G06Q 30/0226* (2023.01)
(Continued)

(52) U.S. Cl.
CPC ......... *G06Q 30/0229* (2013.01); *G06Q 10/02* (2013.01); *G06Q 20/227* (2013.01); *G06Q 30/0215* (2013.01); *G06Q 50/14* (2013.01)

(58) Field of Classification Search
CPC ...................................... G06Q 30/02
(Continued)

(56) References Cited

U.S. PATENT DOCUMENTS 7,774,274 B2    8/2010   Jones et al.
10,878,398 B2   12/2020  Bloy et al.
(Continued)

OTHER PUBLICATIONS

Non-Final Office Action issued in U.S. Appl. No. 16/157,332 dated Apr. 3, 2020, 11 pages.
(Continued)

*Primary Examiner* — Afaf Osman Bilal Ahmed
(74) *Attorney, Agent, or Firm* — Fish & Richardson P.C.

(57) ABSTRACT

The present disclosure involves systems, software, and computer implemented methods for automatically modifying a financial product associated with a user, where the modified financial product is associated with an updated benefit at a partner system. One example method comprises receiving an indication of acceptance associated with a particular partner-related product for replacing a current product associated with a first customer. At least one term or condition associated with the particular partner-related product different than terms or conditions associated with the at least one current product are identified, including a change to at least one benefit associated with the partner system. The terms associated with the current product are modified without changing the unique identifier, and an indication of the at least one updated benefit associated with the partner system is transmitted to the partner system for immediate usage by the first customer.

20 Claims, 6 Drawing Sheets

Related U.S. Application Data continuation-in-part of application No. 16/157,332, filed on Oct. 11, 2018, now Pat. No. 10,878,398.

(51) Int. Cl.
*G06Q 20/22* (2012.01)
*G06Q 50/14* (2012.01)
*G06Q 30/0207* (2023.01)
*G06Q 10/02* (2012.01)

(58) Field of Classification Search
USPC ........................................................ 705/14.1
See application file for complete search history.

(56) References Cited

U.S. PATENT DOCUMENTS

| | | | |
|---|---|---|---|
| 11,295,288 B2 | 4/2022 | Bloy et al. | |
| 11,315,136 B2 | 4/2022 | Bloy et al. | |
| 2004/0117300 A1 | 6/2004 | Jones et al. | |
| 2008/0097783 A1* | 4/2008 | Iannacci | G06Q 30/0281 |
| | | | 705/346 |
| 2011/0258049 A1 | 10/2011 | Ramer et al. | |
| 2020/0334702 A1* | 10/2020 | Butvin | G06Q 30/0226 |

OTHER PUBLICATIONS

Non-Final Office Action issued in U.S. Appl. No. 16/596,004 dated Jun. 10, 2021, 14 pages.
Office Action in Canada Appln. No. 3,020,391, dated Nov. 10, 2022, 5 pages.
Office Action in Canada Appln. No. 3,057,961, dated Aug. 22, 2023, 4 pages.

\* cited by examiner

MODIFYING EXISTING INSTRUMENTS WITHOUT MODIFICATION OF UNIQUE IDENTIFIER AND IMMEDIATE BENEFIT AVAILABILITY

PRIORITY CLAIM

This application is a continuation of and claims the benefit of priority to U.S. patent application Ser. No. 16/596,004, filed Oct. 8, 2019, which is a continuation-in-part of U.S. patent application Ser. No. 16/157,332, filed on Oct. 11, 2018 and now issued as U.S. Pat. No. 10,878,398 on Dec. 29, 2020, the contents of which are incorporated by reference herein.

TECHNICAL FIELD

The present disclosure relates to computer-implemented methods, software, and systems for automatically modifying a digital instrument type associated with a user without modifying an instrument identifier nor requiring a new physical card to be issued before the modified instrument can be used.

BACKGROUND

Customers and payment instrument users may currently be associated with cards that provide them with particular benefits, or with particular rates that they were happy with at one time, but may not be best suited for their current situation.

To obtain a new card, customers must apply for the additional card in a separate transaction, requiring an additional credit check, a delay in obtaining the benefits associated with a new card, and the need to update all saved and stored transactions with new credit card information. Because the new card is different from the original and unrelated to the original card's history, customers may have difficulty obtaining historical account information, and may need to review a closed card's account information to view any activity or information prior to the change-over.

In some instances, current solutions allow for minor changes to card information and rates for retention purposes, without a proactive change or recommendation.

SUMMARY

The present disclosure involves systems, software, and computer-implemented methods for automatically modifying a payment instrument type of a user without modifying a payment instrument identifier. A first example system includes a communications module, at least one memory storing instructions, a repository storing a plurality of account profiles, and a repository storing data associated with a plurality of partner-related products, and at least one hardware processor interoperably coupled with the at least one memory and the communications module. Each account profile is associated with a particular customer and with at least one current partner-related product having a unique identifier associated with the at least one current partner-related product. Each partner-related product is associated with a set of terms and conditions, where the terms and conditions include at least one benefit associated with a partner system corresponding to the partner-related products.

The instructions can instruct the at least one hardware processor to receive, via the communications module, a first signal including an indication of acceptance associated with a particular partner-related product selected from a set of potential partner-related products for replacing a current partner-related product associated with a first customer. At least one term or condition associated with the particular partner-related product different than terms or conditions associated with the at least one current product is identified, where the at least one term or condition includes a change to at least one benefit associated with the partner system. The terms and conditions associated with the at least one current product associated with the first customer are automatically modified to correspond with the at least one different identified term or condition associated with the particular product, where modifying the terms or conditions associated with the at least one current product does not change the unique identifier associated with the at least one current product being modified. A third signal including an indication of at least one updated benefit associated with the partner system is transmitted via the communication module, where the at least one updated benefit is associated with the particular partner-related product.

Implementations can optionally include one or more of the following features.

In some instances, the plurality of partner-related products is a plurality of partner-related financial products, the at least one current partner-related product is at least one current partner-related financial product, and the particular partner-related product is a particular partner-related financial product. In those instances, and prior to receiving the first signal, the instructions can instruct the at least one hardware processor to identify at least one triggering event rule for initiating a financial product analysis for the first customer, where the financial product analysis determines whether at least one of the plurality of partner-related financial products is to be offered as a replacement to the at least one current partner-related financial product associated with the first customer. At least one event source for events associated with the at least one identified triggering event rule is monitored, and, in response to identifying an event associated with the at least one identified triggering event rule, an account profile associated with the first customer is accessed to identify account information associated with the first customer. The account information associated with the first customer is compared with the plurality of partner-related financial products to identify at least one potential partner-related financial product to be offered to the first customer, where the at least one potential partner-related financial product to be offered is associated with a benefit corresponding to the identified event. In response to identifying the at least one potential partner-related financial product to be offered to the first customer, an offer to be presented to a device associated with the first customer is generated, where the generated offer includes the at least one identified potential partner-related financial product, and a second signal including the generated offer is transmitted via the communications module to the device.

In those instances, the current financial product can be associated with a first partner-branded payment card, and the selected financial product may be associated with a second partner-branded payment card different than the first partner-branded payment card. The instructions can then instruct the at least one hardware processor to, after modifying the terms and conditions associated with the at least one current financial product, initiate generation of a new physical payment card corresponding to the second partner-branded payment card, where the unique identifier associated with the current partner-related financial product is the same for the new physical payment card.

In some of those instances, identifying the at least one potential partner-related financial product to be offered to the first customer comprises identifying a particular trigger event rule triggered in response to monitoring the events, determining, from the plurality of partner-related plurality of partner-related financial products, at least one partner-related financial product associated with the identified trigger event rule, identifying a set of customer requirements associated with each of the at least one partner-related financial products, determining, for each of the at least one partner-related financial product associated with the identified trigger event rule, whether the identified set of customer requirements are met by the first customer based on the account information associated with the first customer, and in response to determining that the identified set of customer requirements are met by the first customer for a particular partner-related financial product, including the particular partner-related financial product in the at least one potential partner-related financial product to be offered to the first customer.

In some of those instances, identifying the at least one potential partner-related financial product to be offered to the first customer further comprises generating a customer fit score corresponding to each of the at least one partner-related financial products associated with the identified trigger event rule to be offered to the first customer by applying a customer fit analysis.

In some instances, the generated offer can include, for each of the at least one of the identified potential financial products, an identification of particular terms and conditions associated with the potential financial product and an identification of at least one benefit associated with the partner system.

In some instances, identifying at least one triggering event rule for initiating a financial product analysis for the first customer can include identifying at least one future transaction from the account information associated with the first customer associated with a triggering event rule, wherein identifying an event associated with the at least one identified triggering event rule includes identifying an event from the partner system associated with the future transaction. In some of those instances, identifying the event associated with the at least one identified triggering event rule can include, in addition to identifying the event from the partner system, identifying a location of the first customer corresponding to a location at which execution of the at least one future transaction is scheduled to occur. In some of those instances, the at least one future transaction can include a scheduled reservation for a flight with an airline, where the identified event from the partner system associated with the future transaction includes a flight delay associated with the scheduled reservation, and the location of the first customer is at an airport from which the flight associated with scheduled reservation is to depart.

In some instances, the indication of at least one updated benefit associated with the partner system includes the unique identifier associated with the at least one current product being modified, a loyalty account at the partner system associated with the unique identifier, and the at least one updated benefit associated with the particular partner-related product.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
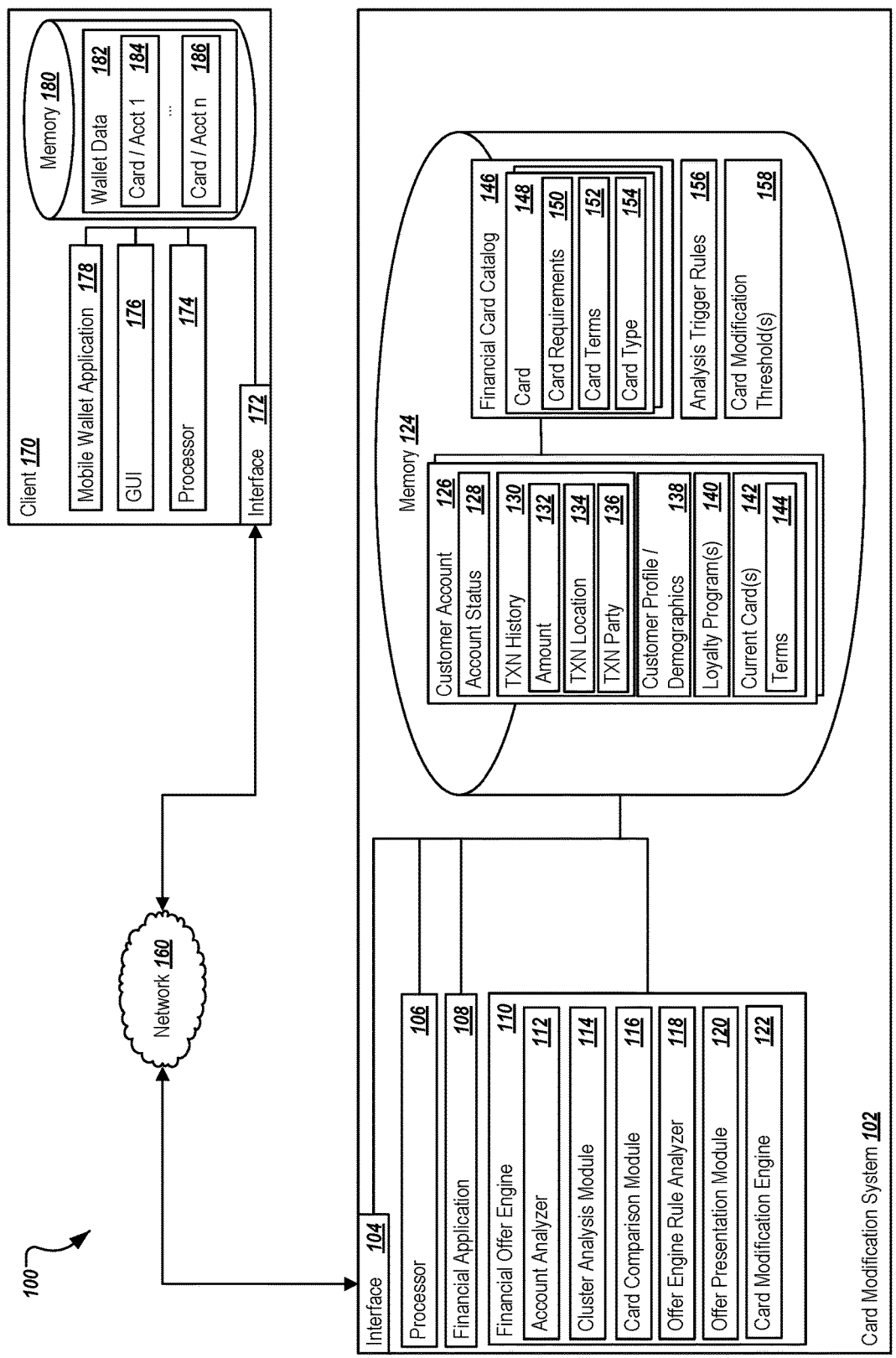
FIG. 1 is a block diagram illustrating an example system for automatically modifying a payment instrument type of a user without modifying a payment instrument identifier.

The present disclosure describes various tools and techniques associated with automatically modifying a payment instrument, or card, type of a user without modifying a payment instrument identifier or card number, such as a personal account number (PAN) associated with and linked to the payment instrument. Using the tools described herein, the payment instrument type can be adjusted to fit a user's demographics, financial history, and other criteria without requiring the user to submit a new application for the new payment instrument type.

The present solution allows the bank or financial institution to proactively identify potential changes to credit card types of users without requiring the customer to change their account number. As banks provide various tiers of credit cards, as well as certain branded or co-branded cards, different levels of qualifications and requirements may apply, as well as a potential usefulness of particular benefits of such cards to particular users. In addition to upgrading a card from one tier to the other, many customers may be interested in or could benefit from the ability to change the type of card (e.g., points to cashback), or to change a co-branded card at which particular benefits may be available (e.g., points/percentage off at Nordstrom's for co-branded card vs. points/percentage off at Amazon with their co-branded card).

One example of the benefits that such a change can provide is related to a financial institution-branded card of one payment type (e.g., MBNA MasterCard) to a merchant co-branded card (e.g., Nordstrom MasterCard) based on customer activity and/or an analysis of a customer's history, including immediate or recent purchases. Such changes to the customer's card (or payment instrument) can enhance partnerships with co-branding opportunities and provide customer and financial institution-related benefits. Subject to payment network regulations and partnership agreements, the payment network of the card may also change.

The financial institution associated with the modified card can use the new tools and system to allow users to maintain their current account information and history, while modifying the card without any of the associated inconveniences normally experienced in a card change, while also reaping significant benefits of a personally-tailored card. As customers have no need to close existing accounts, benefits related to credit bureau scores and evaluations can be realized. Additionally, the customer may save money by avoiding accidental account damage performed while transferring money and funds from a first account type to a second account type. For example, no changes to recurring and automatic payments may need to be made, as they would continue to work as they had before. The only change in the current scenario is to the set of benefits applied to or associated with ongoing and future transactions. In some instances, because the change occurs within a single financial institution, there may be no need for a credit check. Further, benefits of a newly assigned card type may be applied immediately to future transactions, and, in some cases, may be retroactively applied to prior account transactions, including those that were used in part to identify a particular card modification.

In some implementations of the present solution, a financial institution can store information on a plurality of accounts, including customer demographics (e.g., age, sex, jobs, etc.), customer-specific transaction histories, and cards (or other payment instruments) already issued to a customer. Each of those cards may be associated with a specific set of terms and conditions, and each card may be associated with a unique identifier, such as a PAN or card number, for example. The financial institution can also store information on a set of other cards and similar financial products available from the financial institution, where each of those cards and financial products are associated with their own respective set of terms and conditions. In some instances, the terms and conditions associated with different cards and products may include requirements a customer must meet to be eligible for the card, a set of benefits that the card provides, and general terms that cover the use and repayment of transactions associated with the card.

In response to some action or event, the financial system may determine that a financial product analysis should be performed for a specific customer. That determination may be based on a specifically initiated request from the specific customer, a periodic evaluation of customer accounts, or a specific transaction or set of transactions performed by the customer, either a single transaction or a series of transactions performed over time. The financial product analysis can be used to identify one or more of the plurality of financial products available at the financial institution to one or more of the current financial products (e.g., credit cards) currently issued to and/or used by the customer.

The customer's profile, including customer demographic information, recent transactions, and historical transactions, along with other relevant data, can be used to identify, from the set of other cards and financial products available at the financial institution, one or more particular cards and financial products that could be potential replacements for at least one of the customer's current cards. In some instances, the change may be based on a better loyalty points system available, a better annual percentage or other rate, a repayment schedule or amount associated with the financial product, or any other suitable information. In some instances, the customer's demographical information may be used to identify and/or determine cards and financial products used by other customers with similar demographical information to the customer. For example, if other customers in the current customer's age and salary range have or use a particular financial product, then that product may be recommended as a possible replacement to the customer's current card. In general, one or more customer fit algorithms can be applied to determine whether a customer fit score determines that a particular potential replacement product should be offered to the customer.

Once one or more potential replacement products are identified, offers associated with those products can be presented to the customer. The offers can be transmitted to and presented at a device associated with the customer. In some instances, the offer may be sent to the customer's mobile device or computer through a user interface, while in other instances the offer may be sent via email. In some instances, the offer may be sent to a point-of-sale or other location, screen, device at which the customer is performing a current transaction, such as when an offer to modify a current card to a co-branded card at a particular merchant at which a transaction is being performed is presented. The presentation of the potential replacement products can also include a visual comparison of the cards themselves, including any new or modified branding or co-branding of the cards.

In order to meet governmental regulations and to provide customers with information about the potential cards or instruments they are being offered, a set of terms and conditions associated with the new card may be presented. In some instances, a full set of terms and conditions for the new card or instrument may be presented along with the corresponding offer. In other instances, the financial institution may perform a real-time comparison of the terms and conditions of the current card or instrument to the potential card or instrument in the offer. Based on that comparison, an indication of any changed terms and conditions, including any program or loyalty benefit changes, can be presented. In some instances, the indication of the differences must be reviewed and/or accepted prior to allowing the card or instrument modification to continue.

Once an indication of acceptance is received at the financial institution, a backend process can be performed to modify any stored terms and conditions associated with the current financial product to those of the selected financial product. Because the change is performed at the financial institution, the PAN or identifier (e.g., card number) of the current financial product does not need to change. Instead, only those modified terms and conditions as identified need to be changed at the backend system, and can be associated with the current card or financial product, allowing customers to continue using the card in further transactions, including possibly the current transaction, while allowing those transactions to be performed using the updated terms, conditions, and loyalty or other card benefits.

After modifying the terms and conditions, an updated physical card or payment instrument may be created and provided to the customer. The new card may be generated remotely and provided to the customer through a mail or delivery service. The new card may reflect any particular branding associated with the new financial product, such as a retailer's branding, a loyalty or benefits program branding, or any other relevant or associated information of the new product. The new card can include the same identifier as the card it is replacing, ensuring no disruption in use of the now-modified account.

In a second solution, a tool can be provided that allows customers and account holders to be notified about better products for the specific customer based on an analysis of the customer's user account and the customer's connection to one or more loyalty programs, for instance, of co-branded credit or payment cards. The described solution can monitor customer interactions, transactions, and locations, among other information, to determine when a particular change may be advantageous or of value to the customer, while also potentially providing further value to the card issuer or co-branded partner. In some instances, a current payment card may be identified for an upgrade or change into a better version of a currently co-branded card (e.g., from a Rewards Card to a Platinum Rewards Card.)

In one example solution, a card partner (e.g., Amazon, AirCanada, American Airlines, etc.) and/or card provider (e.g., TD Bank, Bank of America, etc.) can identify one or more rules corresponding to particular events performed by a customer, where the occurrence of the event, and in some instances, additional parameters or context, can be determined as an event to trigger a potential credit card change. For example, if a flight or hotel are booked for a trip, an associated rule associated with an airline or hotel provider may be satisfied, and one or more potential card upgrades may be considered and/or offered to the customer. In other instances, location-based actions or events may be identified by the system, and can lead to the trigger or rule associated with a proposed credit card change. For example, arriving at the airport when tied to a prior ticket for a flight may trigger a suggestion to upgrade a standard card to a miles-earning card that may also provide upgraded seats, lounge access, and other similar or related perks determined to be useful or otherwise valuable to the customer. In another example, arriving at a hotel associated with a prior reservation identified in a customer's transaction history may result in a hotel chain's card to be suggested, where the upgraded card may be associated with complimentary upgrades, amenities, or other perks. Still further, mobile app or browsing activities performed by a user may trigger one or more upgrade analyses, such as when a particular item is added to an online shopping cart. In response to adding goods to the shopping cart, an analysis may be triggered by the financial institution to determine if particular parameters are met. If so, and if a particular card upgrade or change is determined to be useful, then a suggestion or offer for a new upgraded card may be triggered, where additional cash-back or other perks may be available.

In each of these solutions, an offer may be provided to a user device or graphical interface associated with the customer so that the customer can evaluate his or her options and elect to accept (if pre-approved) or apply for the upgraded card option. The application can be evaluated and/or approved, or the pre-approval can be accepted, and the credit card can be updated at the financial institution. In connection with the upgraded credit card, the financial institution can immediately, near immediately, or in time provide information associated with the perks of the upgraded card to the partner system associated with those perks. In some instances, the customer account may already be linked to a loyalty account, such that the notification from the financial institution can include the relevant loyalty account number along with the relevant perks. Using that information, the partner system can update its loyalty information, and can provide the perks associated with the upgrade well prior to the physical card being available to the customer. In some instances, the customer account may not be linked to an existing loyalty account, and the interaction may further include a registration step with the partner system to allow the perks to be obtained. Once the new loyalty account is registered to the customer, the user account can be associated with the new loyalty account for future interactions.

In some instances, the rule sets and determinations as to whether a particular partner card upgrade or offer may be of interest can be provided by the partners themselves. Alternatively, the financial institution issuing the cards may evaluate their card options and identify potentially useful and valuable card upgrades to be offered based on their available set of options. Those potential offers can be determined automatically based on an evaluation of each customer and their historical card usage, as well as a machine learning or artificial intelligence-based prediction of likely spending or account usage in the future.

Two example use cases are presented herein to provide an illustration of the example benefits that the described solution may provide. In a first use case, the financial institution may be associated with an airline provider for whom they offer a partner card. The second use case may involve a hotel chain associated with the financial institution, and for which a partner card may be used. In each instance, as well as others not described here, the second party, that is the partner system, maintains a loyalty program that can provide or associate particular perks or advantages to customers who have registered with those partner systems.

In the first example, an airline loyalty account (e.g., Air Canada or American Airlines) may be linked to a particular credit card product for a customer of a financial institution (FI), or to an existing user account. The airline systems and their loyalty account can be linked to the particular card number and/or user account. Based on purchases in the credit card account, as well as or alternatively based on the user account's link to the airline system, a booked flight reservation may be identified for the customer. Due to the link between the systems, the airline system may be able to share information about the reservation with the financial institution as the time of departure nears. If the airline identifies or notifies FI of a flight delay, FI's systems may perform an event triggered analysis to determine whether FI offers any credit card upgrades that may be beneficial to the customer. Events may be associated with particular offers or benefits which can be realized in response to the event. For example, an offer of an upgraded card with private or airline lounge benefits may be identified based on the delayed flight and the possibility that the customer may be interested in an upgrade to increase their comfort during their delay. Based on approval (or pre-approval) for an upgraded card or instrument, FI can identify and generate a new upgrade offer associated with the benefit and the airline system. The upgrade offer can be presented to the customer (e.g., via a mobile app of the FI, or other channels), and, if accepted, the upgrade can be applied at the FI's systems. In connection with that acceptance, the FI can automatically notify the airline's systems of the benefit associated with the upgraded card, even where the new card is not yet available. In doing so, the customer's loyalty account and/or access with the airline can be updated based on the immediate change to the benefits associated with the upgraded card, and the customer can immediately access the lounge benefit based on the card upgrade.

In a second example, a hotel (e.g., Hilton) may provide and manage their own loyalty program (e.g., Hilton Honors), and may offer a co-branded card with the FI. The loyalty program may link the customer's loyalty number with a card or other identifier associated with their account at the FI, including with a particular credit card number. Similarly, the FI may store the loyalty number on the FI's systems and may associate the loyalty number with a Hilton-branded or co-branded credit card that may be associated with a first set of benefits. When the customer goes to check in at a Hilton with their Hilton-branded credit card, or when they approach their hotel after pre-paying for at least a portion of their stay when booking, an event can be triggered upon arrival or at payment time to determine if an upgrade associated with the Hilton loyalty account is available, as well as whether the customer qualifies for such an upgrade offer. The card upgrade offer may be for a card providing an automatic room upgrade, additional points, discounts, or other amenities and benefits at every stay, which may be a relatively better set of benefits than a current card of the customer. The offer can be presented to the customer before or at check-in (e.g., via mobile notification, email, text, phone call, hotel interface, etc.), and can provide information about the updated card, its cost or requirements, and other disclosures or required information. Once the customer accepts the offer, the FI's systems can be updated with the new benefits, and a notification can be transmitted from the FI's systems to the loyalty program's systems, notifying the loyalty system of the card upgrade and the associated benefits. Based on this notification, the customer can immediately receive the benefit of the card upgrade, again without requiring any waiting for the card to arrive and without friction.

In some cases, the card upgrade offers may be made through any channel, but in response to an attempted acceptance, the customer may be pushed to a secure channel for reviewing required disclosures and account information. For example, if an offer comes in through email, a hyperlink may be provided within the email to indicate the customer would like to accept the offer. If activated, the hyperlink can move the customer to a secure web site (e.g., the FI's web front-end for logging in and reviewing the disclosures and terms) or to the FI's secure mobile app, among others.

In some instances, an identified set of potential upgrades can be identified based on a current customer's cards, or based on an upcoming event detected by the FI system, such as based on a pre-authorization for a booking in the future (e.g., for a flight or hotel), or based on location-based detections. For cards that relate to the customer (e.g., if the customer has a relatively lower-tier card of the same co-branding), the FI may pre-adjudicate and authorize the upgrades to allow for immediate offer and acceptance when an event rule associated with an upgrade request is met.

In some instances, the event triggers associated with an offer may be received from the loyalty account or related system (e.g., a flight delay or change, etc.), while in others, the event trigger may be determined based on the FI's analysis of a customer account and transactions. For example, temporary authorizations or charges from a particular vendor with whom a card is associated may be used to evaluate whether an upgrade offer is of value, and can initiate an analysis of whether an offer should be made.

In some instances, periodic analyses of customer accounts can also be used to determine whether particular offers are of interest to a customer. Big data and other analytical analyses can be performed to identify the potential transactions or customer habits that may make such an upgrade attractive and useful to the customer. As one example, if there are multiple airline reservations each quarter for a customer, an event trigger may be identified in response to a next reservation.

In some instances, a determination that an offer should be made for a customer may be made well in advance of the offer actually being presented to the customer. For example, a first determination may be made after a reservation is made with the current credit card. However, the actual offer of the upgraded credit card may be delayed until a particular event or action is detected, such as arriving at the location of the reservation (e.g., airport or hotel) or when an external event occurs (e.g., a flight delay). Those event rules can be predefined or dynamic, and can be modified manually by program administrators, as well as automatically based on additional data and analytics.

Turning to the illustrated example implementation, FIG. 1 is a block diagram illustrating an example system 100 for automatically modifying a payment instrument type of a user without modifying a payment instrument identifier nor requiring a new physical card to be issued before the modifying payment instrument can be used. In general, the system 100 allows the illustrated components to share and communicate information across devices and systems (e.g., card modification system 102 and client 170, among others, via network 160). As described herein, the card modification system 102 may be a cloud-based component or system, while in other instances, non-cloud systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, card modification system 102 and client 170 may be any computer or processing device such as, for example, a blade server, general-purpose personal computer (PC), Mac®, workstation, UNIX-based workstation, or any other suitable device. Moreover, although FIG. 1 illustrates a single card modification system 102, the system 102 can be implemented using a single system or more than those illustrated, as well as computers other than servers, including a server pool. In other words, the present disclosure contemplates computers other than general-purpose computers, as well as computers without conventional operating systems. Similarly, the client 170 may be any system that can request data and/or interact with the card modification system 102. The client 170, also referred to as client device 170, in some instances, may be a desktop system, a client terminal, a point-of-sale (POS), or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 170 may include one or more specific applications executing on the client 170, or the client 170 may include one or more Web browsers or web applications that can interact with particular applications executing remotely from the client 170, such as the financial application 108 and the financial offer engine 110.

The card modification system 102 may be associated with the one or more cloud-based applications or platforms and may be associated with or a part of a cloud platform. As illustrated, the card modification system 102 includes or is associated with interface 104, processor(s) 106, the financial application 108, the financial offer engine 110, and memory 124. The interface 104 is used by the card modification system 102 for communicating with other systems in a distributed environment—including within the environment 100—connected to the network 160, e.g., client 170, one or more retailers, or points-of-sale, etc., and other systems communicably coupled to the illustrated card modification system 102 and/or network 160. Generally, the interface 104 comprises logic encoded in software and/or hardware in a suitable combination and operable to communicate with the network 160 and other components. More specifically, the interface 104 may comprise software supporting one or more communication protocols associated with communications such that the network 160 and/or interface's hardware is operable to communicate physical signals within and outside of the illustrated environment 100. Still further, the interface 104 may allow the card modification system 102 to communicate with the client 170 and/or financial transaction systems (e.g., retailers, point-of-sales (POSs), credit card and financial processing systems, and others, to obtain and/or provide information regarding one or more transactions. Based on this information, the card modification system 102 can obtain and analyze received information about transactions and particular customers.

Network 160 facilitates wireless or wireline communications between the components of the environment 100 (e.g., between the card modification system 102, the client(s) 170, etc.), as well as with any other local or remote computers, such as additional mobile devices, clients, servers, or other devices communicably coupled to network 160, including those not illustrated in FIG. 1. In the illustrated environment, the network 160 is depicted as a single network, but may be comprised of more than one network without departing from the scope of this disclosure, so long as at least a portion of the network 160 may facilitate communications between senders and recipients. In some instances, one or more of the illustrated components (e.g., the card modification system 102) may be included within or deployed to network 160 or a portion thereof as one or more cloud-based services or operations. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11a/b/g/n/ac, 802.20, WiMax, LTE, and/or any other appropriate wireless link. In other words, the network 160 encompasses any internal or external network, networks, sub-network, or combination thereof operable to facilitate communications between various computing components inside and outside the illustrated environment 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

The card modification system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the card modification system 102. Specifically, the processor 106 executes the algorithms and operations described in the illustrated figures, as well as the various software modules and functionality, including the functionality for sending communications to and receiving transmissions from clients 170, as well as to other devices and systems. Each processor 106 may have a single or multiple cores, with each core available to host and execute an individual processing thread. Further, the number of, types of, and particular processors 106 used to execute the operations described herein may be dynamically determined based on a number of requests, interactions, and operations associated with the card modification system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The card modification system 102 can include, among other components, several applications, entities, programs, agents, or other software or similar components capable of performing the operations described herein. As illustrated, the card modification system 102 includes or is associated with a financial application 108 and a financial offer engine 110. The financial application 108 may be any application or program associated with or connected to a financial institution and can include applications linking the card modification system 102 to the information stored at the financial institution. In some instances, the financial application 108 may be an end-to-end financial application, and the financial offer engine 110 and the card modification system 102 as a whole may be a portion thereof. The financial application 108 in the current description provides an application through which the card modification engine 102 can obtain information about transactions performed by one or more customers, can use that information to evaluate potential card modifications, and can interact with a client 170 (e.g., via queries, interactive messages, and user inputs) to obtain approval for and actuate the card modifications based on the described analysis.

The financial offer engine 110 may be associated with or can include an offer management system used to analyze financial data and determine one or more offers satisfying a current context. After determining those offers, the financial offer engine 110 can present the offers to the one or more customers, and, in response to acceptance of those offers, update one or more customer and financial accounts. As illustrated, the financial offer engine 110 includes a plurality of components, although some or all may be included in the inherent functionality of the financial offer engine 110, provided as a separate component from the financial offer engine 110, or included in one or more of the other components. The illustrated financial offer engine 110 includes an account analyzer 112, a cluster analysis module 114, a card comparison module 116, an offer engine rule analyzer 118, an offer presentation module 120, and a card modification engine 122. These components combine to perform the operations associated with the card modification system 102, although alternative, additional, or combined components may perform the operations in other instances or implementations. Specifically, one or more programs, applications, or other components may perform combinations of the functionality described herein, and are not meant to require separate or disparate components. Further, while the functionality of the financial offer engine 110 is described separately, multiple functions may be combined and performed by a single component, while other functions may be separated and performed by two or more components, where those separate functions may be performed individually or in combination with one another.

The account analyzer 112 can perform analyses of transactions and information associated with a particular customer account 126, and can be used to determine when, or if, a card modification analysis should be performed. The account analyzer 112 can determine that a card modification analysis should be performed in response to an explicit request received from the client 170, in some instances. In other instances, the account analyzer 112 may apply one or more analysis trigger rules 156 to determine when the card modification analysis should be performed. In some instances, the analysis trigger rules 156 may include rules associated with individual transactions or events. For example, the card modification analysis could be triggered after a particular transaction is performed at a retailer or merchant above a certain threshold transaction amount. In some instances, triggers for the individual transactions may be associated with retailers or merchants who are associated with one or more financial products (e.g., cards 148) including in a financial institution's financial card catalog 146. Based on a particular amount spent at the particular retailer or merchant, the corresponding analysis trigger rule 156 can be met. By doing so, a large transaction at a merchant or retailer can be performed with a modified card during or in association with a checkout process, where the modified card is associated with a loyalty program or set of benefits that are related to the current transaction. In other instances, the analysis trigger rules 156 may include rules associated with a cumulative amount or number of transactions. For example, if a certain threshold amount has been spent on groceries by a customer over a period of time, the card modification analysis can be triggered. Alternatively, the threshold amount spent over a period of time may be specific to a particular retailer, to a particular category of transactions, or based on any other suitable factor. In other instances, if a certain threshold number of transactions have been performed by the customer in general, of a certain type or associated with a certain category of goods or services, or with a particular retailer or merchant, then the card modification analysis can be triggered. Any suitable triggering rules may be used. In still other instances, the trigger rules may include rules for periodic customer account analyses, where the card modification analysis is performed at recurring or determined intervals.

The cluster analysis module 114 can be used to compare a particular customer account to one or more other customer accounts based on similarities between the accounts. In some instances, the cluster analysis module 114 can be used to identify a particular set of customer profiles and demographical information 138, where that information is used to identify a corresponding group of customer accounts 126 with similar profiles and demographics. For example, a married customer living in Texas with an average annual income of $75,000 and a particular set of accounts may be in a similar position to other similarly situated customers. By comparing information of those other customer accounts 126 with the account 126 of the particular customer, an identification of current cards 142 held by those other customers can be identified an included in a card modification analysis. The cluster analysis module 114 may also perform an analysis to determine when other similar customers are performing or requesting card modifications. Based on that information, the cluster analysis module 114 or another component can update particular rules from the analysis trigger rules 156. The updates may be associated with the particular customer or a larger set of customers.

The card comparison module 116 can perform a comparison of one or more available cards 148 included in the financial card catalog 146. The financial card catalog 146 can store information associated with and defining a plurality of financial products. While described in FIG. 1 as cards (e.g., credit, debit, or charge cards), any suitable financial product may be used in the present solution. For each card 148 included in the financial card catalog 146, a set of card requirements 150, a set of card terms and conditions 152, and information about the card type 154 can be stored, along with any other relevant information. The card requirements 150 can provide information defined by the financial institution or card provider as to which customers may be eligible for particular cards or financial products. For example, a first card may include a minimum credit score, a minimum yearly income amount, a minimum debt-to-income ratio, or any other suitable card requirements. The card requirements may be the same as card requirements for initial application. The card terms 152 can include a set of terms identifying interest rates, repayment requirements, card benefits, and any other term or condition information associated with the card, including arbitration clauses, restrictions in uses of the cards, etc. The card benefits may identify one or more loyalty programs associated with the customer, which may also be identified in the card requirements 150 in cases where the card 148 requires that the customer be a member of the loyalty program before allowing the card 148 to be applied for or used.

The card comparison module 116 can identify one or more potential cards 148 that may be offered to the particular customer based on the card requirements 150. In some instances, the card comparison module 116 may provide or perform a customer fit analysis on the customer information included in the customer account 126 to determine whether one or more of the cards 148 comprises a fit for the customer. In some instances, the customer fit analysis can take particular aspects of the customer account and compare or analyze how those aspects match up or correspond to particular attributes of one or more cards 148. For example, a customer fit algorithm can be executed for each of the financial products or cards to generate, for example, a customer fit score. The score may be based on a point scale (e.g., 1-10, 1-100, etc.) or any other ranking system. Various customer fit algorithms may be applied, including algorithms based on a customer's transaction history 130, account status 128 (e.g., pending balance, zero balance, etc.), customer profile or demographics 138, current loyalty programs 140 of which the customer is associated, as well as the current cards 142 to which the customer has been issued. Any suitable customer fit algorithm may be performed. Alternatively, the card comparison module 116 can generate a benefit analysis based on the customer's prior transactions and/or based on the impact to the customer if the current activity of the customer remains similar. The benefit analysis can generate a benefit score which may provide an expected relative benefit to a current card 142 or an expected absolute benefit (e.g., $500 more in money back, 20000 more reward points, etc.) based on the analysis.

An offer engine rule analyzer 118 can be separate from or a part of the card comparison module 116 and can analyze one or more card modification threshold rules 158 in light of the customer fit analyses and scores generated by the card comparison module 116. The card modification threshold rules 158 can identify particular customer fit scores or benefit analyses, which may be required to be met prior to a particular new card to be presented as an option to the particular customer. For example, if a customer fit analysis generates scores on a scale between 0 and 10, only scores above a 7 may be considered as worthy of including in an offer to the customer. In some instances, a customer fit analysis may be performed on the current card or cards 142 of the particular customer. In those instances, the card modification threshold rules 158 may determine that any potential cards 148 with scores better than the current card(s) 142 may be included in an offer to the particular customer. The offer engine rule analyzer 118 can identify, after its analysis, which of the potential cards 148 should be provided to the customer for consideration in a card modification.

The offer presentation module 120 can be used to present a particular offer to the customer. In some instances, the offer can be generated by the presentation module 120, formatted for presentation to the customer, and transmitted via interface 104 and the financial offer engine 110 or the financial application 108 to the client 170 associated with the customer. In some instances, the offer presentation module 120 may be provided where the presentation of the offer is via a web page or a particular client application executing on the client 170. The offer presentation module 120 may generate the offer based on the information received from the offer engine rule analyzer 118, and can pull relevant information from the financial card catalog 146 associated with those particular cards 148 to be offered. The offer presentation module 120 can generate an actionable offer, where the particular customer can interact with the presentation to select one of the particular cards 148 for card modification. The offer presentation module 120 may be able to provide the offer for presentation and interaction at the client 170, including via a client application associated with the financial application 108 (e.g., a banking or financial mobile app), or through a mobile browser accessing the financial application 108 and/or the financial offer engine 110. In some instances, the offer presentation module 120 can present some or all of the card terms 152 of the card(s) 148 included in the offer. In some instances, the terms and disclosures may be provided or made available with the offer. In other instances, only those terms 152 which differ from the terms 144 of the current card 142 may be presented with the offer. In still other instances, the full or partial set of terms 152 associated with the offered cards 148 may only be presented after an indication that a particular card 148 has been selected by the particular customer from the offer. In those instances, prior to enacting the selected modification, a set of terms and disclosures from the card terms 152 can be provided to the customer via the offer presentation module 120. Any presentation and acceptance of the new card terms 152 can be performed in accordance with any financial laws or regulations of the local and national jurisdictions in which the card modification process is occurring or relates.

In response to receiving a selection of a particular card 148 from the offer, and after reviewing and accepting any particular terms and disclosures of the selected card 148, the selection can be provided to the card modification engine 122. The card modification engine 122 can perform the operations associated with updating the terms 144 of the current card 142 to correspond to the card terms 152 of the selected card 148. In the update, however, any particular identifier (e.g., PAN, card number, etc.) will be maintained such that the existing card 142 can continue to be used by the customer. To do so, the set of terms 144 associated with the current card 142 being modified can be adjusted to match the card terms 152 of the selected card 148. In some instances, the card comparison module 116 can perform the comparison and identify one or more terms 144 that should be changed. The card modification engine 122 can perform those changes as associated with the customer account 126 and its current card 142, such that an updated set of terms 144 of the current card 142 matches the card terms 152 as indicated in the financial card catalog 146. If the card 148 corresponds to any particular loyalty programs, the card modification engine 122 can also update any links from the current card 142 to the particular loyalty programs 140 associated with the selected card.

In some instances, the card modification engine 122 may also generate and transmit an instruction to have a new physical card associated with the updated current card 142 created and provided to the particular customer. The card modification engine 122 may correspond, for example, with the financial application 108 to request the new physical card, where the financial application 108 can provide or direct that request to an appropriate department at the financial institution.

Memory 124 of the card modification system 102 may represent a single memory or multiple memories. The memory 124 may include any memory or database module and may take the form of volatile or non-volatile memory including, without limitation, magnetic media, optical media, random access memory (RAM), read-only memory (ROM), removable media, or any other suitable local or remote memory component. The memory 124 may store various objects or data, including financial data, user and/or account information, administrative settings, password information, caches, applications, backup data, repositories storing business and/or dynamic information, and any other appropriate information associated with the card modification system 102, including any parameters, variables, algorithms, instructions, rules, constraints, or references thereto. Additionally, the memory 124 may store any other appropriate data, such as VPN applications, firmware logs and policies, firewall policies, a security or access log, print or other reporting files, as well as others. While illustrated within the card modification system 102, memory 124 or any portion thereof, including some or all of the particular illustrated components, may be located remote from the card modification system 102 in some instances, including as a cloud application or repository, or as a separate cloud application or repository when the card modification system 102 itself is a cloud-based system. In some instances, some or all of memory 124 may be located in, associated with, or available through one or more other financial systems of the associated financial institution. In those examples, the data stored in memory 124 may be accessible, for example, via the financial application 108.

As illustrated and previously described, memory 124 includes the plurality of customer accounts 126, the financial card catalog 146, the set of analysis trigger rules 156, and the card modification thresholds 158. Each customer account 126 can store information with one or more current cards 142, including information identifying the particular terms 144 that are associated with those cards. Based on those terms 144, which may include any associated benefits, rates, and other information associated with the corresponding card 142, transactions entered into by the customer using a particular card 142 can be processed and managed. The transaction history 130 of the customer account 126 can identify various transactions, with each transaction including information on an amount 132 of a particular transaction, a location 134 of the transaction, and a party or merchant 136 associated with the transaction. The customer profile and demographics 138 can provide information describing the particular customer associated with the customer account 126. The account status 128 of the customer account 126 can provide or detail information related to current balances, late fees, and other relevant information about the status of the particular customer account 126. The loyalty programs 140 can identify the particular loyalty programs to which the customer account 126 is associated, and may include links to or associations with one or more current cards 142.

As illustrated, one or more clients 170 may be present in the example system 100. Each client 170 may be associated with one or more customer accounts 126, either as a client device at which the customer of the customer account 126 is linked, or as a client device through which the particular customer accesses financial information and can interact with one or more offers for card modification. As illustrated, the client 170 may include an interface 172 for communication (similar to or different from interface 104), at least one processor 174 (similar to or different from processor 106), a graphical user interface (GUI) 176, a mobile wallet application 178, and a memory 180 (similar to or different from memory 124).

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with one or more client applications, such as one or more dedicated mobile applications, including a mobile wallet application 178, and an output device that conveys information associated with the operation of the applications and their application windows to the user of the client 170. Such information may include digital data, visual information, or a GUI 176, as shown with respect to the client 170. Alternatively or in addition, the client 170 may allow for voice presentations and voice interactions to be performed, such as by presenting information or options via a speaker, and then receiving responsive input via a microphone of the client 170. Specifically, the client 170 may be any computing device operable to communicate with the card modification system 102, other clients 170, and/or other components via network 160, as well as with the network 160, using a wireline or wireless connection. In general, client 170 comprises an electronic computer device operable to receive, transmit, process, and store any appropriate data associated with the environment 100 of FIG. 1.

The client applications executing on the client 170 may include any suitable application, program, mobile app, or other component. Client applications can interact with the financial institution applications (e.g., financial application 108) and the card modification system 102 via network 160. In some instances, the client application may be a web browser, where the functionality of the client application may be realized using a web application or website the user can interact with via the client application. In other instances, the client application may be a remote agent, component, or client-side version of the card modification system 102, financial institution, or another component. In some instances, the client application may interact directly with the card modification system 102 or portions thereof. The client application may be used to initiate or trigger a card modification analysis based on user input, and/or may be used to present information associated with the operations of the card modification analysis after it is triggered.

GUI 176 of the client 170 interfaces with at least a portion of the environment 100 for any suitable purpose, including generating a visual representation of any particular client application, the mobile wallet application 178, and/or the content associated with any components of the card modification system 102. In particular, the GUI 176 may be used to present results of a card modification analysis, including providing one or more offers to the customer at the client 170, as well as to otherwise interact and present information associated with one or more applications. GUI 176 may also be used to view and interact with various web pages, applications, and web services located local or external to the client 170. Generally, the GUI 176 provides the user with an efficient and user-friendly presentation of data provided by or communicated within the system. The GUI 176 may comprise a plurality of customizable frames or views having interactive fields, pull-down lists, and buttons operated by the user. In general, the GUI 176 is often configurable, supports a combination of tables and graphs (bar, line, pie, status dials, etc.), and is able to build real-time portals, application windows, and presentations. Therefore, the GUI 176 contemplates any suitable graphical user interface, such as a combination of a generic web browser, a web-enable application, intelligent engine, and command line interface (CLI) that processes information in the platform and efficiently presents the results to the user visually.

The mobile wallet application 178 may be an application associated with a mobile wallet, and can be used, along with memory 180 (which may be similar to or different from memory 124), to store a set of wallet data 182. The set of wallet data 182 can include information about one or more cards and/or accounts, including card 1 184 and card n 186. Each of those cards may be associated with a particular account identifier (e.g., a card number, a PAN, etc.), where the card number can be used by the mobile wallet application 178 to engage in and complete one or more transactions using the client 170. In the present solution, the wallet data 182 may not be changed or modified after the card modification analysis and card modification operations are performed to update the terms 144 associated with a particular card 142. In particular, the account identifier of the cards 184, 186 stored in the wallet may remain the same, allowing the customer to continue using the cards for transactions after the modification is made. In some instances, an image associated with the cards may change based on the card modification, but otherwise the stored card information can be used without modifying the card number or other identifier.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
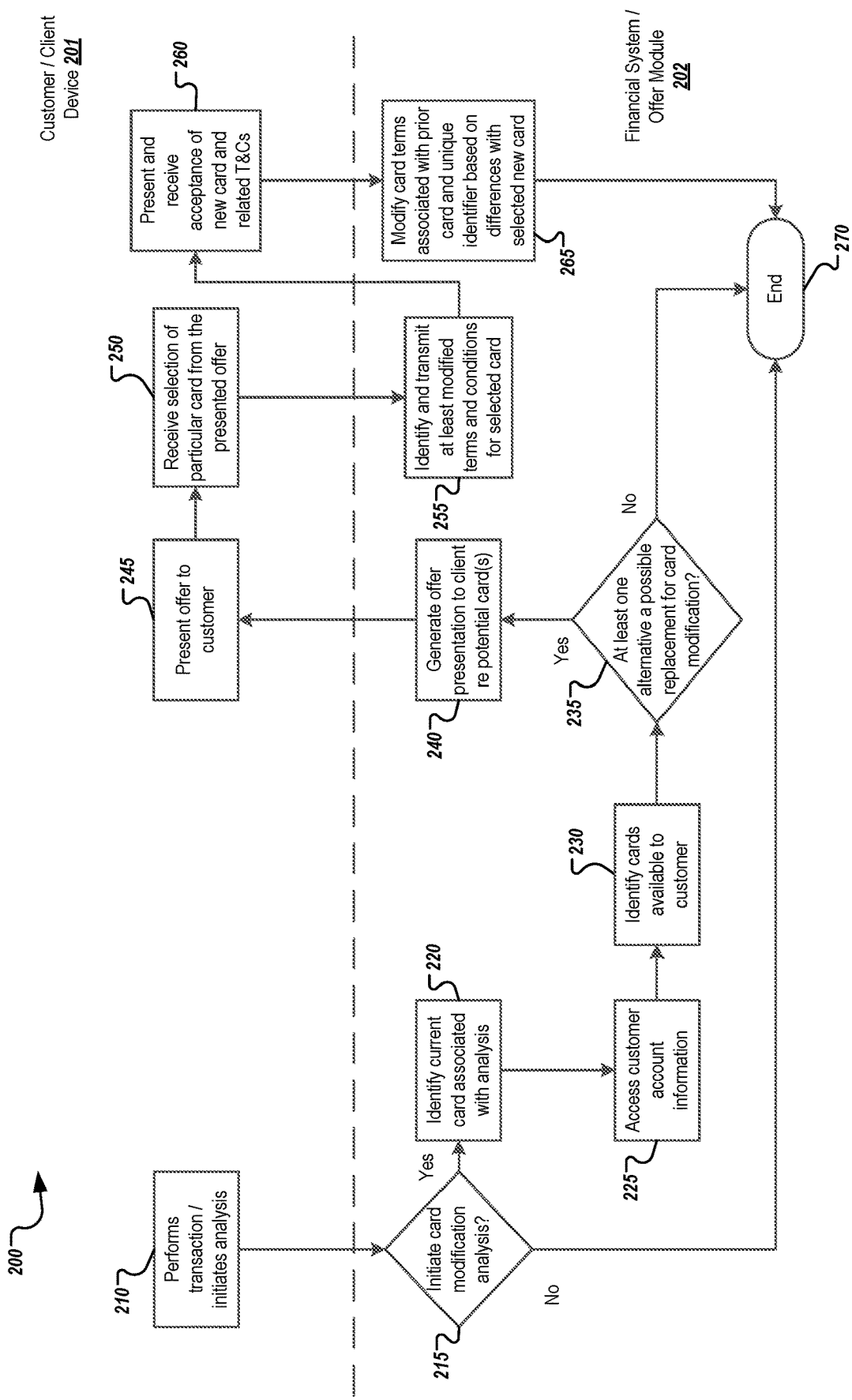
FIG. 2 is a flow chart diagram of an example implementation for performing the payment instrument modification described herein.

FIG. 2 is a flow chart diagram of an example implementation for performing the payment instrument modification described herein. Method 200 as illustrated provides an example series of interactions between a client device 201 associated with the customer and a financial system 202 which may be associated with an offer module managing a card modification operation.

At 210, a customer can perform a transaction or interaction where a card modification analysis is initiated. In some instances, the interaction may be a specific request from the customer to perform a card modification analysis, while in other instances, the transaction may be a normal transaction, such as an action associated with a purchase, or actions associated with an account login. Information about the interaction can be monitored and analyzed at 215 by the financial system 202 to determine whether to initiate the analysis. Where the transaction is a specific request to perform the card modification analysis, the determination at 215 can move to 220. In some instances, the transaction itself may trigger the analysis (e.g., a transaction of a particular size or amount), while in others the transaction when combined with one or more previously performed transactions may trigger the analysis (e.g., where a threshold number of transactions are performed after the current transaction, or where a threshold overall amount has been included in a plurality of transactions). Any number of card modification analysis triggers may exist, such that different types of interactions and transactions cause the card modification analysis to be performed. Further, in some instances, automatic and periodic account reviews may trigger the analysis without regard for a particular transaction or request from the client device 201. If the determination is made that no card modification analysis is to be made, method 200 can complete the transaction and end at 270.

At 220, a current card associated with the analysis can be identified. In some instances, the current card may be a card used in a transaction at 210. Identifying the current card may include identifying or accessing a set of current card terms associated with the current card. At 225, a set of customer account information can be accessed, where that information may relate to any suitable information to be used in the card modification analysis. Relevant information can include, but is not limited to, information regarding a creditworthiness of the customer, a current set of cards and credit limits and spending abilities on the available cards, a set of loyalty programs to which the customer is associated or enrolled, current balances on the current card and/or one or more other cards, and information regarding one or more historical or other prior transactions (e.g., transaction amounts, locations, parties, frequency of transactions, etc.), among others. In some instances, demographic information associated with or at least partially defining or classifying the customer may be accessed. The information can, in some instances, also identify a particular cluster or peer group in which the customer falls or has been classified. The cluster or peer group can represent a set of one or more similar customers (e.g., based on age, location, occupation, salary range, etc., or a combination thereof).

At 230, one or more cards available to the customer can be identified. In some instances, each of the cards available to the financial system 202 to be offered to the customer may be associated with one or more card requirements. At 230, the information associated with or about the customer can be used to identify any particular cards, which the customer may not be eligible for based on the requirements, or alternatively, those sets of cards for which the customer may be eligible. Of all possible cards or payment instruments that can be issued by the financial institution associated with financial system 202, a subset of those cards are identified as potential recommended cards for the current customer at 230.

At 235, a determination is made as to whether at least one of the alternative cards from the subset of those cards (identified at 230) may be a possible replacement with which to perform card modification for the customer and their current card. The determination as to whether one of the cards may be a possible replacement may take many forms and algorithms. In one instances, a customer fit analysis can be performed for each of the potential cards that are available for the customer. The customer fit analysis can generate a customer fit score for each of the cards. In some instances, the customer fit analysis can determine whether the benefits and terms associated with a particular potential card match or correspond to the spending habits or history of the customer, or match or correspond to a card that is likely to be of interest to a customer of the same demographics (e.g., based on the clustering or peer group consideration). If any of the customer fit scores exceed an offer threshold, then those cards may be considered possible replacements, and method 200 can continue to 240; otherwise, if no possible replacements exist, method 200 can end at 270. In some instances, a customer fit score may also be performed for the customer's current card(s). If the customer fit score for the current card exceeds the customer fit score for a potential alternative card, then that potential alternative card may be discarded. It will be understood by persons of skill in the art that any suitable algorithm or method of determination as to whether a particular potential card represents a possible alternative can be used. Further, in some instances, the determination that a particular set of cards are available to the customer at 230 may be the at least one alternative determined in 235, where no further consideration or analysis is required before the offer is generated at 240. In some instances, however, a subset of the potential cards may be identified as possible replacements for card modification. In one such example, 10 cards may be suitable for the customer, but settings associated with the process may determine that only a subset of those cards should be offered to the customer. This paring of potential cards may be based on a maximum number of results to be provided, an identified separation in the relative scoring or comparison of the cards during the analysis of 235 (e.g., 4 customer fit scores in the 8+ score range, while the other cards have customer fit scores in the 5 and below range; in such instances, only the former may be offered or identified as possible replacements).

At 240, the financial system 202 (or offer module) can generate an offer for presentation to the client through a suitable interface, and can include the particular cards identified at 235 to the client 201 for review by the customer. The offer may include highlighted benefits of the potential cards based on the performed analysis. In some instances, the offer may also include or link to one or more of the terms or conditions of the particular cards included in the offer. In some instances, the offer may embed, link, or otherwise include mechanisms to allow the customer to select, via a user interface, particular cards for card modification. In some instances, a chart or illustration comparing the possible replacement cards to the current card may be included in the offer.

After transmission to the client device 201, at 245 the offer can be presented to the customer, such as through a user interface. At 250, the user may select or identify a particular one of the possible replacement cards included in the offer for acceptance in the card modification. The selection can be transmitted to the financial system 202, where at least any modified terms and conditions associated with the selected card (as compared to the current card) can be identified and transmitted to the client device 201 for acceptance. In some instances, all of the terms and conditions of the selected card may be provided at 255. In some instances, the modified or entire set of terms and conditions may be provided to the client device 201 initially with the offer, where, in response to the received selection of 250, the terms and conditions of the selected card can be available without an additional round-trip.

At 260, the terms and conditions associated with the selected card can be presented to the customer, along with any required disclosures, and the acceptance of the terms, conditions, and disclosures can be received. Any governmental requirements for acceptance of the terms and conditions can be met by 260 and the other operations of method 200. Once the acceptance is received, the client device 201 can notify the financial system 202.

In response to receiving notification of the selection of the particular card and the acceptance of the relevant terms and conditions, the financial system 202 can, at 265, perform a modification of the card terms associated with the current card to those of the selected card. Because the card is managed by the financial system, the unique card identifier of the current card can remain the same after the modification of the card terms and information, allowing the customer to use a current physical card associated with the unique identifier to remain valid. The card modifications can be performed on the backend, such that any future transactions performed with the card will continue to work, but will be processed on the backend corresponding to the updated terms and conditions of the selected card. In some instances, only the modified terms may be updated on the backend. In some instances, the change may be as simple as a change to a rate of a card, a particular rewards or loyalty program associated with future transactions with the card, or new benefits not previously available from the prior card. Once the card terms have been modified at the financial system 202, method 200 can complete at 270.

In some instances, the financial system 202 can further trigger a new physical card to be generated and provided to the customer, particularly where the new replacement card is associated with different branding or membership information as compared to the prior card.

In some instances, the modified terms can be applied to all future events and transactions associated with the card of the prior and current unique identifier. Additionally, in some instances, benefits associated with the new replacement card may be applied retroactively to one or more actions and transactions performed prior to the card modification. For example, a particular large transaction or set of transactions may trigger the card analysis and determine that a card co-branded from a particular merchant (e.g., Target) at which those transactions were performed may be a good replacement card. Once the change has been enacted, in an effort to further enhance the benefits of the replacement card, the financial system 202 can retroactively apply a corresponding discount or allow for points to be earned on prior transactions.

In some instances, the operations of method 200 can be performed in response to and prior to completion of a particular transaction. In association with and after modifying the card terms at 265, the particular transaction can then be processed according to the newly applied card terms of the selected new card.

Figure 3:
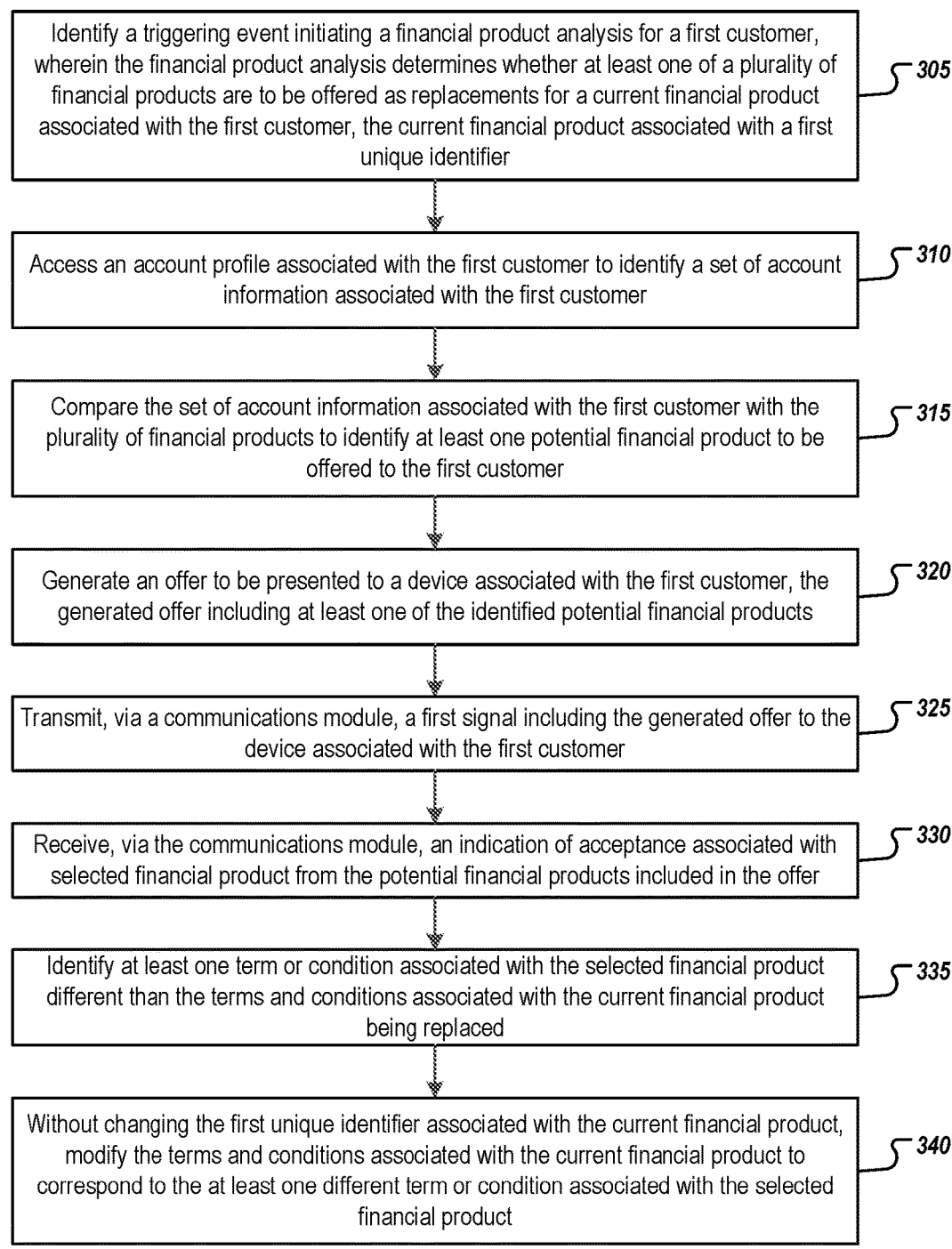
FIG. 3 is a flow chart diagram of an example method for automatically modifying a payment instrument type of a user without modifying a payment instrument identifier in one example implementation.

FIG. 3 is a flow diagram of an example method 300 for automatically modifying a payment instrument type of a user without modifying a payment instrument identifier in one example implementation. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 can be performed by the card modification system 102, or portions thereof, described in FIG. 1, as well as other components or functionality described in other portions of this description.

In one instance, method 300 describes a method performed within a system of a financial institution or card provider comprising a communications module, at least one memory, and at least one hardware processor interoperably coupled with the at least one memory and the communications module. The at least one memory can include a repository storing a plurality of account profiles for one or more customers, as well as a repository storing data associated with and defining a plurality of financial products offered by the financial institution or card provider. Further, each of the account profiles for the one or more customers can be associated with at least one current financial product (e.g., the current financial product), where the current financial product is associated with or identified by a unique identifier. The unique identifier may be a card number or primary account number (PAN) for a payment card in some instances. The unique identifier is meant to be used in transactions using the current financial product, and can uniquely identify the particular card and account, which is used in a transaction. Each of the financial products, including the current financial product, may be associated with a set of terms and conditions. The memory may also store instructions that instruct the at least one hardware processor to perform particular operations.

Turning to method 300, at 305 a triggering event initiating a financial product analysis for a first customer is identified. The financial product analysis that is triggered can be used to determine whether at least one of the financial products from the repository of financial products are to be offered as a replacement of the current financial product associated with the first customer.

In some instances, one or more events, actions, transactions, or combinations thereof may be associated with the triggering event. In some instances, the triggering event may be a determination that the first customer initiates a transaction that exceeds a transaction threshold amount. In some instances, that transaction may be associated with a particular retailer, including where the particular retailer is associated with at least one of the plurality of financial products different from the current financial product used in the transaction. In some instances, that retailer-associated financial product may provide benefits when used at the retailer, including interest-free transactions over a period of time, additional loyalty or reward points for purchases, cash back or discounts on particular transactions, or other suitable benefits. In some instances, if the retailer-associated financial product is eventually selected, a current transaction and/or at least one prior transaction may be retroactively associated with the benefits of the retailer-associated financial product, including by providing specific credit terms associated with the financial product, allowing particular rewards to be earned for those prior transactions, as well as other retroactive benefits.

In some instances, the triggering event may be identified based on a current transaction when considered in light of at least one prior transaction. For example, a determination that a cumulative amount spent by the first customer over a period of time exceeds a threshold cumulative transaction amount may trigger the analysis. In other instances, a determination that a number of transactions performed over a period of time exceed a threshold cumulative number of transactions may trigger the analysis. Any suitable analysis triggers may be defined and evaluated within the system based on individual and cumulative customer actions.

In some instances, the triggering event may be an automatic, periodic or other time-based customer account analysis, and may be triggered apart from any particular transactions or interactions of the customer. In still other instances, the triggering event may be based on a user login to a website of the financial institution, or a manual request for the analysis initiated by the customer or by another authorized user or customer service agent.

At 310, an account profile associated with the first customer can be accessed to identify a set of account information associated with the first customer. The set of identified account information may include demographic information associated with the first customer, historical transaction information associated with one or more transactions performed by the customer, customer account status, particular loyalty and/or rewards accounts for particular merchants or service providers to which the customer is enrolled or associated, as well other suitable information. In some instances, based on at least one a subset of the account information, one or more clustering attributes may be identified for the first customer, including those based on the demographic information. The clustering information can be used to identify similar situated customers to whom the first customer can be compared.

At 315, the set of account information associated with the first customer can be compared with or to the plurality of financial products, where the comparison can be used to identify at least one potential financial product to be offered to the first customer. Any suitable comparison algorithm may be used or applied. For example, general recommendation algorithms may be used, such as user-based collaborative filtering, content-based filtering, hybrid recommendation systems, risk-aware recommender systems, or any other suitable recommendation algorithm or system may be used. In some instances, before the potential products for offer are identified during the comparison, an initial identification of one or more customer requirements can be identified for at least some of the plurality of financial products from the repository. For each of those financial products, a determination is made as to whether the customer requirements are met or satisfied by the first customer based on the first customer's account information. Requirements for a particular financial product may include income requirements, credit score requirements, a determination that a current card is already issued to the customer, credit and transaction history requirements, and others. If the customer meets or exceeds the requirements for a particular financial product, then that financial product may be added to or included in an initial set of financial products to be offered to the first customer. In some instances, those financial products may be offered to the customer, while in other instances, additional or alternative analysis can be performed. For example, in some instances, a customer fit algorithm may be performed to generate a customer fit score corresponding to the potential financial products. In some instances, a customer fit score may also be generated for a current financial product of the first customer. The customer fit scores may be represented on any suitable value scale, such as 0 to 10. In some instances, once the customer fit scores are generated, any financial products associated with a customer fit score below a predefined customer fit threshold (e.g., 7.0) may be removed from the potential financial products to be offered. Alternatively, if a customer fit score for a current card is generated, and then any financial products associated with a customer fit score below the customer fit score for the current financial product may be removed from the potential financial products to be offered. In other instances, the fit scores may be augmented by alternate scores related to profitability of the particular products. In those instances, the fit score may be modified by an expected profitability of the product to the financial institution in combination with any other suitable factors. In other instances, the scores may be augmented by a likely overall cost of the product to the customer, where lower costs to the customer may increase a fit score. In any of these instances, the system may evaluate the customer prior to determining any augmenting factors to be applied to the fit score, and any suitable adjustments and adjustment considerations can be provided.

At 320, an offer to be presented to a device associated with the first customer can be generated. The generated offer can include at least one of the identified potential financial products. In some instances, the number of potential financial products included in the offer may be limited to a maximum amount. That maximum can be any suitable number of offers, or may be based on an analyzed best set of offers to be presented. That is, if three (3) of the offers are very high customer fits (e.g., scores above 9), and the other offers are lower (e.g., scores at 7), only the top products may be included in the offer. The generated offer may be generated as a message including hyperlinks associated with each offer, such as an email or text message. In other instances, the generated offer may be a web page or application page, or may include information to be provided to an application executing at the device of the first customer, where that application will format and present the generated offer.

At 325, a first signal including the generated offer can be transmitted, via a communications module, to a device associated with the first customer. The device may be a mobile device associated with the customer account of the first customer, such as a smartphone or tablet. Alternatively, the device may be a registered laptop or desktop computer of the first customer. In still other instances, the device may be a point-of-sale or display at a merchant where the first customer is performing a transaction. For example, if the offer is for a branded credit card at a particular retailer and is offered in response to a transaction at that retailer, the new branded credit card may be included in the offer and presented at the point-of-sale during the transaction. In some instances, the offer may include a set of terms and conditions associated with each of the financial products. The set of terms and conditions may be a link to review the specific terms and conditions. In some instances, only the terms and conditions which differ from those of the current financial product's terms and conditions may be included or presented. In still other instances, only a high-level indication of the particular benefits of the potential financial product may be presented, with the terms and conditions being presented after a particular product is selected.

At 330, an indication of acceptance associated with a selected financial product from the set of potential financial products included in the offer can be received via the communications module in a second signal. The indication may be associated with an explicit user selection via a user interface at a display or screen at which the generated offer was presented after 325. In some instances, a full set of terms and disclosures associated with the selected financial product may not have been provided to and explicitly accepted by the first customer. In those instances, the full set of terms and disclosures associated with the selected financial product can be identified and transmitted to the device associated with the first customer for review and acceptance. Any such presentation of the terms and conditions is subject to governing law and regulations, and the presentation or device-side application through which the presentation is made can ensure that all such laws and regulations are followed.

In response to receiving the acceptance of the selected financial product, method 300 continues at 335. At 335, at least one term or condition associated with the selected financial product can be identified as different from an existing term or condition associated with the current financial product being replaced or modified. In some instances, a comparison analysis may be performed, or the differences may have already been identified in generating the offer and/or at another time. Based on the determined differences, at 340, the terms and conditions associated with the current financial product are modified to correspond to the at least one different term or condition associated with the selected financial product. Importantly, the first unique identifier associated with the current financial product is not changed or modified at 340, such that the modified financial product retains the exact same first unique identifier. In doing so, transactions may still be executed using the existing financial product, although how those transactions are processed may differ based on the updated terms and conditions.

In some instances, after the terms and conditions are modified using the modification process, and where the financial product is a payment card or related financial product associated with a physical card or instrument, a process for generating a new physical financial product or payment card can be initiated or otherwise triggered. The new physical product or card can reflect any new branding associated with the selected financial product but will retain the first unique identifier. In some instances, updated security information and expiration dates can be added to the newly generated card. Once generated, the card can be sent to an address or location at which the first customer is associated.

Figure 4:
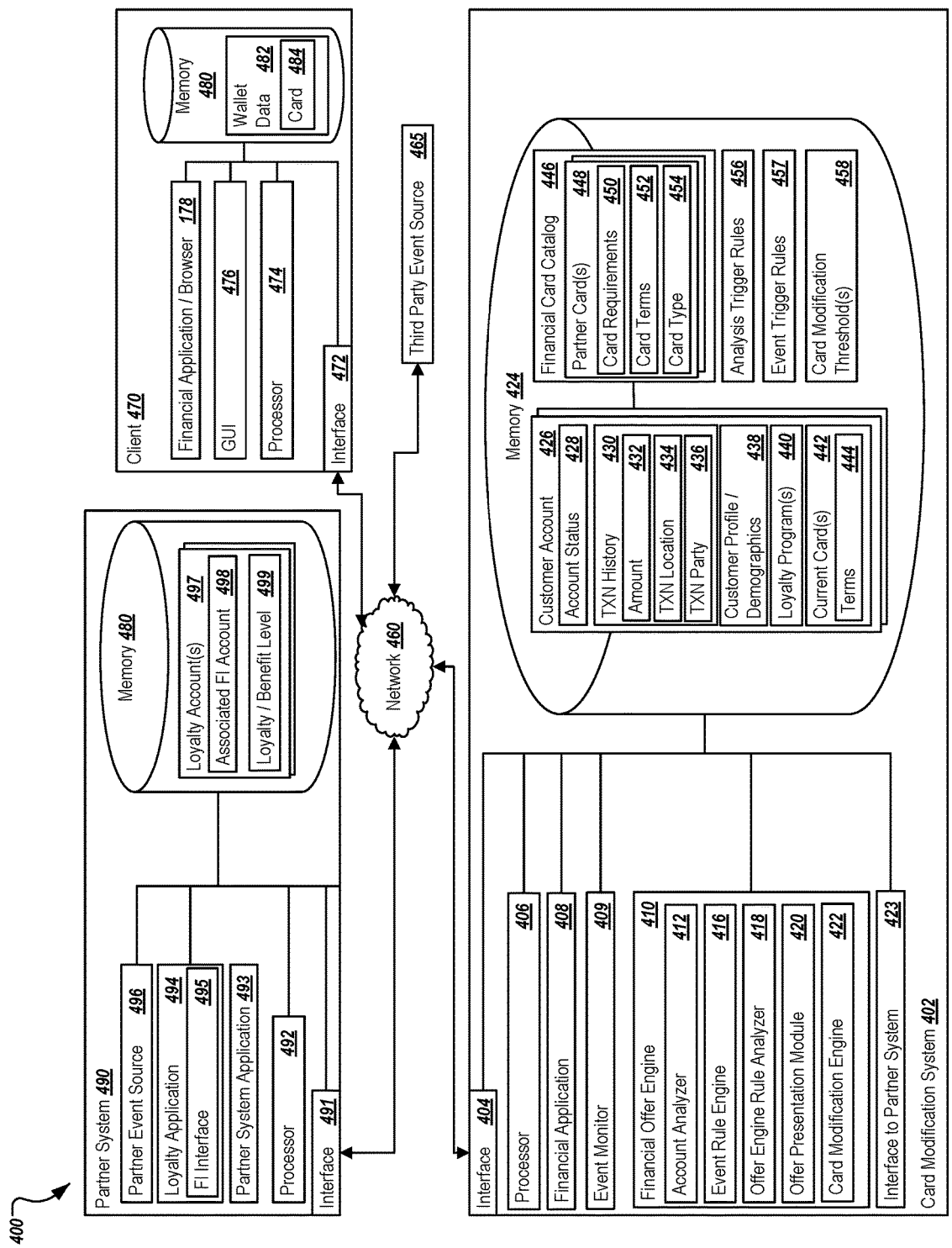
FIG. 4 is a block diagram illustrating an example system for automatically upgrading an existing credit card to a relatively improved benefit card for a partner, and providing that information to the partner system for immediate usage upon acceptance and conversion at the financial institution.

FIG. 4 illustrates an example system associated with the second solution described herein, related to the credit card upgrade system and tools. Portions of system 100 are illustrated as part of system 400, while some portions are omitted. Still further, some other new portions not included in system 100 are added for illustration. In general, a system similar to system 100 may be used to perform the operations related to system 400, although any suitable system could also be used to implement the solution described herein and obtain the described benefits. Further, portions of system 400 that are not included in system 100 can, in some instances, be modified or the same components of system 100. The converse can be true, as well. Any suitable combination of components may be used to perform the operations and interactions described herein.

Turning to the illustrated example implementation, FIG. 4 is a block diagram illustrating an example system 400 for automatically identifying potential upgrades of partner cards for a user based on an event or customer analysis. Similar to the first solution of FIGS. 1-3, the card itself, or the payment instrument type of the customer, can be modified using the described solution without modifying a payment instrument identifier or card number, nor requiring a new physical card to be issued before the modifying payment instrument can be used. Further, any benefits associated with the upgraded card or payment instrument can be immediately communicated to a partner system to allow for improved or alternative benefits that arise from the new card to be realized in real-time upon acceptance/approval of the upgrade.

In general, the system 400 allows the illustrated components to share and communicate information across devices and systems (e.g., card modification system 402 and partner system 490, among others, via network 460). As described herein, the card modification system 402 and/or the partner system 490 may be a cloud-based component or system, while in other instances, non-cloud systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server. The card modification system 402 and client 470 may be similar to or different than the card modification system 102 and client 170 of FIG. 1. Similarly, the partner system 490 may be any computer or processing device such as, for example, a blade server, general-purpose personal computer (PC), Mac®, workstation, UNIX-based workstation, or any other suitable device, as well as a single system or more than those illustrated, as well as computers other than servers, including a server pool. In general, each illustrated component may be adapted to execute any suitable operating system, including Linux, UNIX, Windows, Mac OS®, Java™, Android™, Windows Phone OS, or iOS™, among others. The client 470 may include one or more specific applications executing on the client 470 (e.g., financial application 478), or the client 470 may include one or more Web browsers or web applications 478 that can interact with particular applications executing remotely from the client 470, such as the financial application 408 and the financial offer engine 410, among others.

The card modification system 402, similar to the card modification system 102 described in FIG. 1, may be associated with the one or more cloud-based applications or platforms and may be associated with or a part of a cloud platform. As illustrated, the card modification system 402 includes or is associated with interface 404, processor(s) 406, the financial application 408, the financial offer engine 410, and memory 424. The interface 404 is used by the card modification system 402 for communicating with other systems in a distributed environment—including within the environment 400—connected to the network 460, e.g., client 470, partner system 490, one or more retailers, or points-of-sale, etc., and other systems communicably coupled to the illustrated card modification system 402 and/or network 460. Interface 404 may be similar to or different from interface 104 of FIG. 1, and allows communications such that the network 460 and/or the interface's hardware is operable to communicate physical signals within and outside of the illustrated environment 400. Still further, the interface 404 may allow the card modification system 402 to communicate with the client 470, the partner system 490, financial transaction systems (e.g., retailers, point-of-sales (POSs), credit card and financial processing systems, and others, to obtain and/or provide information regarding one or more transactions and/or events. Based on this information, the card modification system 402 can obtain and analyze received information about transactions, particular customers, and events associated with or related to the partner system 490 and/or the partner system's connection to one or more customers.

Network 460 may be similar to or different from network 160, and generally can facilitate wireless or wireline communications between the components of the environment 400 (e.g., between the card modification system 402, the client(s) 470, and the partner system 490, etc.), as well as with any other local or remote computers, such as additional mobile devices, clients, servers, or other devices communicably coupled to network 460, including those not illustrated in FIG. 4.

The card modification system 402 includes one or more processors 406. Although illustrated as a single processor 406 in FIG. 1, multiple processors may be used according to particular needs, desires, or particular implementations of the environment 400. Each processor 406 may be similar to or different than the processors 106 of FIG. 1. Generally, the processor 406 executes instructions and manipulates data to perform the operations of the card modification system 402. Specifically, the processor 406 executes the algorithms and operations described in the illustrated figures, as well as the various software modules and functionality, including the functionality for sending communications to and receiving transmissions from clients 470 and partner systems 490, as well as to other devices and systems.

The card modification system 402 can include, among other components, several applications, entities, programs, agents, other software, or similar components capable of performing the operations described herein. As illustrated, the card modification system 402 includes or is associated with a financial application 408 and a financial offer engine 410. The financial application 408 may be any application or program associated with or connected to a financial institution and can include applications linking the card modification system 402 to the information stored at the financial institution. In some instances, the financial application 408 may be an end-to-end financial application, and the financial offer engine 410 and the card modification system 402 as a whole may be a portion thereof. The financial application 408 in the current description provides an application through which the card modification engine 402 can obtain information about transactions performed by one or more customers, as well as events associated with one or more transactions or planned activities associated with a particular customer, and can use that information to evaluate potential card modifications based on one or more relevant card benefits that may be of likely interest to the customer. The financial offer engine 410, in analyzing the current cards and the identified events and/or transactions, can be used to identify one or more potential card upgrades that provide relevant benefits related to a co-brander of the current card and for which the customer qualifies.

The financial offer engine 410 may be associated with or can include an offer management system used to analyze financial data and events and determine one or more offers satisfying a current context, particularly as they relate to a current event or action associated with the customer. After determining those offers, the financial offer engine 410 can present the offers to the one or more customers, and, in response to acceptance of those offers, update one or more customer and financial accounts. In addition to updating the particular card, the financial offer engine 410 can use an interface to the partner system 423 to transmit information about one or more relevant benefits associated with the new card, and can ensure that the partner system 490 associates those benefits with the customer in an immediate or near immediate manner.

As illustrated, the financial offer engine 410 includes a plurality of components, although some or all may be included in the inherent functionality of the financial offer engine 410, provided as a separate component from the financial offer engine 410, or included in one or more of the other components. The illustrated financial offer engine 410 includes an account analyzer 412, an event rule engine 416, an offer engine rule analyzer 418, an offer presentation module 420, and a card modification engine 422. These components combine to perform the operations associated with the financial offer engine 410, although alternative, additional, or combined components may perform the operations in other instances or implementations. Specifically, one or more programs, applications, or other components may perform combinations of the functionality described herein, and are not meant to require separate or disparate components. Further, while the functionality of the financial offer engine 410 is described separately, multiple functions may be combined and performed by a single component, while other functions may be separated and performed by two or more components, where those separate functions may be performed individually or in combination with one another.

The account analyzer 412 and the event rule engine 416 can perform analyses of transactions, information, and events associated with particular customer accounts 426 (e.g., a particular reservation, a purchase, or location-based information) and/or partner systems or operations (e.g., flight delay, hotel stay, etc.), and can be used to determine when, or if, a card modification analysis should be performed based on one or more events that are occurring or have been identified. Further, if such an analysis is to be made, the offer engine rule analyzer 418 can be used to evaluate whether the particular customer account 426 qualifies for, and would be interested in, an upgraded card.

The event rule engine 416 can be used to evaluate various event trigger rules 457 that are used to determine when one or more cards of the customer should be considered for an upgrade. In some instances, the event trigger rules 457 may be separate from the analysis trigger rules 456, which determine whether, in response to the event, an analysis of potential upgrades should be made. For example, the event trigger rules 457 may be associated with a rule that causes event indications related to flight delays to initially, and potentially, trigger a full analysis. In those instances, the fact that there is a flight delay coupled with the fact that a user associated with the particular customer account 426 is at the airport already may initiate an analysis of whether a particular upgraded card offer should be made, or at least evaluated. The analysis trigger rules 456 can then determine, based on a current context of the user associated with the customer account 426, whether an upgrade offer is available and should be made. For example, the analysis trigger rules 456 may consider the current card(s) 442 associated with the customer account 426 in light of the triggering event to determine whether one or more upgraded or alternative partner cards 448 are available in a financial card catalog 446 (which may be similar to financial card catalog 146, and can include card requirements 450, card terms 452, and card types 454). Further, the analysis trigger rules 456 may also determine whether the current event is associated with a changed benefit or term 452 of the upgraded or alternative partner cards 448. For example, if the current card 442 already provides a high level of benefits, the analysis trigger rules 456 may determine that either no upgraded partner cards 448 exist, or that the benefits associated with those cards are not an enhancement with regard to the event that triggered the analysis. For example, if the event is a flight delay, the analysis trigger rules 456 may determine that a benefit related to additional miles per purchase is unnecessary or otherwise not relevant to the current situation.

The event trigger rules 457 may be associated with any suitable types of events, including information obtained from a customer's device (e.g., client 470, such as location information or data indicating arrival at a relevant location such as an airport or hotel), information from a partner system 490 (e.g., flight delays), from the financial institution (e.g., based on a detected transaction for the customer that has entered the transaction history 430 of the customer account 426), or from third-party information sources (e.g., public databases, flight databases, weather websites or apps, etc.). Further, certain event trigger rules 457 may be active for particular customer accounts 426 based on their existing and current cards 442, as well as the related partner cards 448 that are available. If a customer is associated with a highest level of a partner-branded card in a tier of multiple cards, the event trigger rules 457 may be turned off, or inactive, as no enhancement may be available. Alternatively, the event trigger rules 457 may be activated to identify events related to alternative partner cards 448 and the benefits associated therewith. For example, if an alternative card provides additional free bags, while the current card provides free access to a premium lounge, a determination that the customer has arrived at the airport with his family (e.g., based on calendar information received from client 470) may inform the system that a potential offer to cover some of the additional bags that may be with the family should be offered.

In some instances, the event trigger rules 457 and the analysis trigger rules 456 may be combined into a single rule set, with portions of the rules performing different portions of the determinations and analysis.

The event rule engine 416 uses these event trigger rules 457 to determine when a further analysis is to be performed in response to receiving event information. Event information can be monitored from the customer account 426, as information received from or about the customer (e.g., location information from client 470, check-in information from a social network associated with the customer, etc.), as information from the partner system 490 (e.g., customer completed a flight check-in process, flight delay, room readiness delay, etc.), or as related information from a third-party source.

Events can be monitored via an event monitor 409, which can include or represent one or more interfaces, APIs, communication endpoints, or other connections to relevant sources. The event monitor 409 may parse different information and provide such information to the event rule engine 416, which can then evaluate the received events as possible triggers for a further analysis.

In response to determining that an event does trigger a potential card upgrade, the account analyzer 412 can determine whether the card modification should be performed using the one or more analysis trigger rules 456 and event trigger rules 457 being triggered. The analysis trigger rules 456 may determine, for particular customers, when one or more evaluations as to whether an upgrade analysis should be performed after an event potentially triggering the update is received. As described above, the analysis trigger rules 456 can compare the received event to the analysis trigger rules 456 to determine which potential upgrades are relevant. The account analyzer 412 can evaluate whether the upgrade options for available partner cards 448 provide relatively better alternatives to the current cards 442 of the customer. If so, the account analyzer 412 can identify the specific partner card 448 from the financial card catalog 446 to the offer engine rule analyzer 418. In some instances, the account analyzer 412 can, based on information about the customer account 426 and status 428, determine if a potential partner card 448 is or would be approved for the customer. If not, the account analyzer 412 can terminate the analysis and no upgrade may be presented. If approved or likely to be approved, then the offer can be passed to the offer engine rule analyzer 418 for further processing.

In some instances, the account analyzer 412 can execute one or more customer fit algorithms for one or more of the financial products or cards to generate, for example, a customer fit score. The customer fit score can be used to determine if the card modification thresholds 458 are met, and can use any suitable information, including customer transaction history 430, which can include the amount 432, location 434, and parties 436 to transactions. Other demographic information 438 can be used to identify the appropriate fit of particular partner cards 448.

The offer engine rule analyzer 418 can analyze one or more card modification threshold rules 458 in light of the customer fit analyses and scores generated by the account analyzer 412 or any other suitable component to determine whether a particular upgrade card is to be offered. The card modification threshold rules 458 can identify particular customer fit scores or benefit analyses to determine if the current offer makes sense or would likely be of interest to the customer, which may be required to be met prior to a particular new card to be presented as an option to the particular customer. For example, only relevant benefits may be considered in upgraded cards. If a customer already has priority access, a card offering such access may not be suitable. The degree of fit and improved benefit can be considered by the account analyzer 412 based on the card modification rules.

The offer presentation module 420 may be similar to offer presentation module 120, and can be used to present a particular offer to the customer. In some instances, the offer can be generated by the offer presentation module 420, formatted for presentation to the customer, and transmitted via interface 404 and the financial offer engine 410 or the financial application 408 to the client 470 associated with the customer. In some instances, the offer presentation module 420 may be provided where the presentation of the offer is via a web page or a particular client application executing on the client 470. The offer presentation module 420 may generate the offer based on the information received from the offer engine rule analyzer 418, and can pull relevant information from the financial card catalog 446 associated with those particular upgraded cards 448 to be offered. The offer presentation module 420 can generate an actionable offer, where the particular customer can interact with the presentation to select one of the particular cards 448 for card modification. The offer presentation module 420 may be able to provide the offer for presentation and interaction at the client 470, including via a client application associated with the financial application 408 (e.g., a banking or financial mobile app), or through a mobile browser accessing the financial application 408 and/or the financial offer engine 410. In some instances, the offer presentation module 420 can present some or all of the card terms 452 of the card(s) 448 included in the offer. In some instances, the terms and disclosures may be provided or made available with the offer. In other instances, only those terms 452 which differ from the terms 444 of the current card 442 may be presented with the offer, along with a clear indication of the enhanced, improved, or additional benefits available. In still other instances, the full or partial set of terms 452 associated with the offered upgrade card(s) 448 may only be presented after an indication that a particular card 448 has been selected by the particular customer from the offer. In those instances, prior to enacting the selected modification, a set of terms and disclosures from the card terms 452 can be provided to the customer via the offer presentation module 420. Any presentation and acceptance of the new card terms 452 can be performed in accordance with any financial laws or regulations of the local and national jurisdictions in which the card modification process is occurring or relates.

In response to receiving a selection of a particular card 448 from the offer, and after reviewing and accepting any particular terms and disclosures of the selected card 448, the selection can be provided to the card modification engine 422. The card modification engine 422 can perform the operations associated with updating the terms 444 of the current card 442 to correspond to the card terms 452 of the selected card 448. In the update, however, any particular identifier (e.g., PAN, card number, etc.) will be maintained such that the existing card 442 can continue to be used by the customer. To do so, the set of terms 444 associated with the current card 442 being modified can be adjusted to match the card terms 452 of the selected card 448. In some instances, a determination can be made (e.g., by the card comparison module 116 described in FIG. 1) and can perform the comparison and identify one or more terms 444 that should be changed. The card modification engine 422 can perform those changes as associated with the customer account 426 and its current card 442, such that an updated set of terms 444 of the current card 442 matches the card terms 452 as indicated in the financial card catalog 446. If the card 448 corresponds to any particular loyalty programs, the card modification engine 422 can also update any links from the current card 442 to the particular loyalty programs 440 associated with the selected card. In particular, a listing of benefits associated with the updated and upgraded card can be included in the loyalty program 440 information.

In some instances, the card modification engine 422 may also generate and transmit an instruction to have a new physical card associated with the updated current card 442 created, including, for example, with any updated branding or benefit information, and provided to the particular customer. The card modification engine 422 may correspond, for example, with the financial application 408 to request the new physical card, where the financial application 408 can provide or direct that request to an appropriate department at the financial institution.

In order to provide immediate benefits to the customer, the card modification system 402 includes an interface to the partner system 423. The interface to the partner system 423 may be a specific connection or API to the partner system 490, or may be a particular message interaction through normal communication channels. Further, there may be a multiple interfaces to partner systems 423, each associated with a particular partner system 490, or there may be a single (or less than a 1:1 ratio number of) interfaces to partner systems 423 that communicates with multiple systems. The interface to the partner system 423 can send communication to those partner systems 490 in response to the upgraded card being selected and approved by a customer. In doing so, the benefits inherent to the upgraded card may be realized immediately. In some instances, the card modification system 402 may correspond or communicate with a partner system application 493 that manages such information at the partner system 490, where the partner system application 493 can automatically update a loyalty or benefit level 499 associated with a linked loyalty account 497 for the customer. In other instances, the information may be available for reference via a suitable messaging scheme or upgrade request and authorization upon interaction with an agent or person associated with the partner system, such as a flight attendant or check-in clerk. In some instances, the benefits may be automatically applied to the next interaction with the partner system 490. For example, if the customer accepts an upgraded card associated with a particular airline while at the airport, where the new card provides private lounge access, the customer may visit the lounge after the upgrade and be provided access in the airline's (i.e., the partner) system based on the upgraded card. In cases where the automatic upgrade is not included in the partner's system, information about the upgrade can be provided via the client 470 and/or by a reference to or communication with the financial institution.

Memory 424 of the card modification system 402 may be similar to or different than memory 124 of FIG. 1. Further, while illustrated within the card modification system 402, memory 424 or any portion thereof, including some or all of the particular illustrated components, may be located remote from the card modification system 402 in some instances, including as a cloud application or repository, or as a separate cloud application or repository when the card modification system 402 itself is a cloud-based system. In some instances, some or all of memory 424 may be located in, associated with, or available through one or more other financial systems of the associated financial institution. In those examples, the data stored in memory 424 may be accessible, for example, via the financial application 408.

As illustrated and previously described, memory 424 includes the plurality of customer accounts 426, the financial card catalog 446, the set of analysis trigger rules 456, the event trigger rules 457, and the card modification thresholds 458. Each customer account 426 can store information with one or more current cards 442, including information identifying the particular terms 444 that are associated with those cards. Based on those terms 444, which may include any associated benefits, rates, and other information associated with the corresponding card 442, transactions entered into by the customer using a particular card 442 can be processed and managed. The transaction history 430 of the customer account 426 can identify various transactions, with each transaction including information on an amount 432 of a particular transaction, a location 434 of the transaction, and a party or merchant 436 associated with the transaction. The customer profile and demographics 438 can provide information describing the particular customer associated with the customer account 426. The account status 428 of the customer account 426 can provide or detail information related to current balances, late fees, and other relevant information about the status of the particular customer account 426. The loyalty programs 440 can identify the particular loyalty programs to which the customer account 426 is associated, and in particular, provide a link between the particular customer account 426 and one or more loyalty accounts 497, as well as links to or associations with one or more current cards 442. When the interface to partner system 423 is used to update the partner system 490 with new benefit information, the loyalty program information 440 can be shared and the information linked to an existing loyalty account for immediate use.

As illustrated, one or more clients 470 may be present in the example system 400. Each client 470 may be similar to or different than clients 170 of FIG. 1. Each client may be associated with one or more customer accounts 426, either as a client device at which the customer of the customer account 426 is linked, or as a client device through which the particular customer accesses financial information and can interact with one or more offers for card modification and benefit upgrade. As illustrated, the client 470 may include an interface 472 for communication (similar to or different from interface 404), at least one processor 474 (similar to or different from processor 406), a graphical user interface (GUI) 476, a financial application or browser 478 (e.g., a mobile wallet or institution-supported app), and a memory 480 (similar to or different from memory 424).

The illustrated client 470 is intended to encompass any computing device such as a desktop computer, laptop/notebook computer, mobile device, smartphone, personal data assistant (PDA), tablet computing device, one or more processors within these devices, or any other suitable processing device. In general, the client 470 and its components may be adapted to execute any operating system, including Linux, UNIX, Windows, Mac OS®, Java™, Android™, or iOS. In some instances, the client 470 may comprise a computer that includes an input device, such as a keypad, touch screen, or other device(s) that can interact with one or more client applications, such as one or more dedicated mobile applications, including a financial application and/or web browser 178, and an output device that conveys information associated with the operation of the applications and their application windows to the user of the client 470. Such information may include digital data, visual information, or a GUI 476, as shown with respect to the client 470. Alternatively or in addition, the client 470 may allow for voice presentations and voice interactions to be performed, such as by presenting information or options via a speaker, and then receiving responsive input via a microphone of the client 470. Specifically, the client 470 may be any computing device operable to communicate with the card modification system 402, other clients 470, and/or other components via network 460, as well as with the network 460, using a wireline or wireless connection. In general, client 470 comprises an electronic computer device operable to receive, transmit, process, and store any appropriate data associated with the environment 400 of FIG. 4.

The client applications executing on the client 470 may include any suitable application, program, mobile app, or other component. Client applications, including the financial application or browser 478, can interact with the financial institution applications (e.g., financial application 408) and the card modification system 402 via network 460. In some instances, the client application may be a web browser, where the functionality of the client application may be realized using a web application or website the user can interact with via the client application. In other instances, the client application may be a remote agent, component, or client-side version of the card modification system 402, financial institution, or another component. In some instances, the client application may interact directly with the card modification system 402 or portions thereof. The client application may be used to initiate or trigger a card modification analysis based on user input, and/or may be used to present information associated with the operations of the card modification analysis after it is triggered. In some instances, the client 470 may provide event information to the card modification system 402 and/or the partner system 490, such as location information, and/or information associated with either the card modification system 402 or the partner system 490, as well as other relevant information. The event information may include location information (e.g., location is near or at the airport for a flight or a hotel at which a prior reservation has been made), as well as any other suitable information derivable from the client 470.

GUI 476 of the client 470 interfaces with at least a portion of the environment 400 for any suitable purpose, including generating a visual representation of any particular client application, the financial application or browser 478, and/or the content associated with any components of the card modification system 402 or the partner system 490. In particular, the GUI 476 may be used to present results of a card modification analysis, including providing one or more card upgrade offers to the customer at the client 470, as well as to otherwise interact and present information associated with one or more applications. GUI 476 may also be used to view and interact with various web pages, applications, and web services located local or external to the client 470. Generally, the GUI 476 provides the user with an efficient and user-friendly presentation of data provided by or communicated within the system. The GUI 476 may comprise a plurality of customizable frames or views having interactive fields, pull-down lists, and buttons operated by the user. In general, the GUI 476 is often configurable, supports a combination of tables and graphs (bar, line, pie, status dials, etc.), and is able to build real-time portals, application windows, and presentations. Therefore, the GUI 476 contemplates any suitable graphical user interface, such as a combination of a generic web browser, a web-enabled application, intelligent engine, and command line interface (CLI) that processes information in the platform and efficiently presents the results to the user visually.

The financial application or browser 478 be an application associated with a financial institution, and can be used, along with memory 480 (which may be similar to or different from memory 424), to store a set of wallet data 482. The set of wallet data 482 can include information about one or more cards and/or accounts, including at least one card 484. Each of those cards may be associated with a particular account identifier (e.g., a card number, a PAN, etc.), which can be used by the financial application 478 to engage in and complete one or more transactions using the client 470, e.g., as a mobile wallet. In the present solution, the wallet data 482 may not be changed or modified after the card modification analysis and card modification operations are performed to update the terms 444 associated with a particular card 442. In particular, the account identifier of the cards 484 stored in the wallet may remain the same, allowing the customer to continue using the cards for transactions after the modification is made. In some instances, an image associated with the cards may change based on the card modification, but otherwise the stored card information can be used without modifying the card number or other identifier. In some instances, the wallet data 482 may also include information about one or more loyalty accounts 497 associated with partner systems 490, where available and current benefit levels can be stored and available for presentation. Further, any offers for upgrades can be securely presented and accepted via the financial application or browser 478, such that private information about terms and costs can be adequately provided to the user prior to upgrading the card.

As illustrated, FIG. 4 includes the partner system 490, which may be any cloud- or on-premise application or platform associated with a business or entity that provides card-based and/or card-related loyalty benefits in association with one or more financial institutions, including a financial institution related to the card modification system 402. The partner system 490 can manage at least one loyalty program for its customers, including by providing points and/or other benefits for particular customers at certain levels of their loyalty program. In some instances, the partner card(s) 448 associated with the partner system 490 and its loyalty program may each provide particular benefits to customers who are part of the program, in additional to any benefits those customers may receive as members of the loyalty program through uses of the partner's products or services (e.g., flights, hotel stays, etc.). In the described solution, the partner system 490 can provide, in some cases, relevant event information via the partner event source 496 regarding their services (e.g., a flight delay, a hotel stay change, a particular reservation being booked by a customer etc.) about their services, which can then be used by the card modification system 402 to evaluate whether one or more potential card upgrades should be offered. When those upgrades are accepted, information about the account change and/or any associated benefit changes due to the upgraded card can be provided to the partner system 490 (e.g., via the partner system application 493, or via a financial institution (FI) interface 495), which can then be stored in memory 480 as associated with a particular linked loyalty account 497.

As illustrated, the partner system 490 includes or is associated with interface 491, processor(s) 492, a partner system application 493, a loyalty application 494, a partner event source 496, and memory 480, where information on one or more loyalty accounts 497 are stored and managed.

Interface 491 may be similar to or different than interface 404, and can allow the partner system 490 to communicate with other components. Interface 491 may be similar to or different from interface 404 or interface 104 of FIG. 1, and allows communications such that the network 460 and/or the interface's hardware is operable to communicate physical signals within and outside of the illustrated environment 400. Still further, the interface 491 may allow the partner system 490 to communicate with the client 470, the card modification system 402, and/or other relevant systems. Information on current benefits and loyalty accounts 497 can be accessed by the client 470 or other authorized users associated with particular loyalty accounts 497, as well as by the financial institution, where authorized.

The partner system 490 includes one or more processors 492. Although illustrated as a single processor 492 in FIG. 4, multiple processors may be used according to particular needs, desires, or particular implementations of the environment 400. Each processor 492 may be similar to or different from the processors 406 and 106 of FIG. 1. Generally, the processor 492 executes instructions and manipulates data to perform the operations of the partner system 490. Specifically, the processor 492 executes the algorithms and operations described in the illustrated figures, as well as the various software modules and functionality, including the functionality for sending communications to and receiving transmissions from clients 470 and card modification systems 402, as well as to other devices and systems.

As described, the partner system application 493 may be an application used to perform any particular operations associated with the partner system 490, such as customer relationship management, sales, service-based operations, or any other suitable operations associated with the partner system 490. The partner system application 493 may interact with or include a loyalty application 494, which can manage the loyalty program of the particular partner system 490. The loyalty application 494 can use information about particular loyalty accounts 497 to manage loyalty benefits, marketing and advertising programs, and any other suitable loyalty-related operations. In some instances, the loyalty application 494 can include a financial system interface 495, where interactions with the loyalty program and/or the financial system can be shared, where appropriate, between the systems. In particular, purchase of goods and/or services from the partner system 490 may be linked to the loyalty account 497, such that additional points or benefits may be added to the loyalty account 497 of the customer. Additionally, further perks or points may be earned at the financial system, where the FI interface 495 provides that information back for additional benefits from the financial system. Still further, purchases using the current card 442 may earn points in the loyalty program of the partner system 490, such that additional points may be earned for the corresponding loyalty account 497. As described herein, additional benefits based on a particular partner card 448, when assigned as the customer's current card 442, may be obtained and, based on having the card, provided to the customer. In those instances, the loyalty account 497 can be associated with a corresponding or associated financial institution account 498, which may also be associated with a particular loyalty and/or benefit level 499. In some instances, customers may have earned a first set of benefits based on their loyalty participation, and a second set of benefits may be provided based on their particular card terms 444 and benefit. When the card is updated, the present solution can ensure those additional benefits are associated with the loyalty account through a connection and communication from the card modification system 402 to the partner system 490. Using that update after the card has been updated, any corresponding benefits can be immediately included in the system and used for any upcoming transactions.

As illustrated in FIG. 4, one or more additional third party event sources 465 may be used to identify particular events of interest related to particular customers. For example, the third party event sources 465 can include social media accounts and postings, as well as weather information, travel advisories, and other information that may be suitably used to identify particular card modifications for improved benefits. The event monitor 409 can be associated with and/or monitor one or more third party event sources 465, as well as the partner event sources 496 and any information available from client 470.

While portions of the elements illustrated in FIG. 4 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 5:
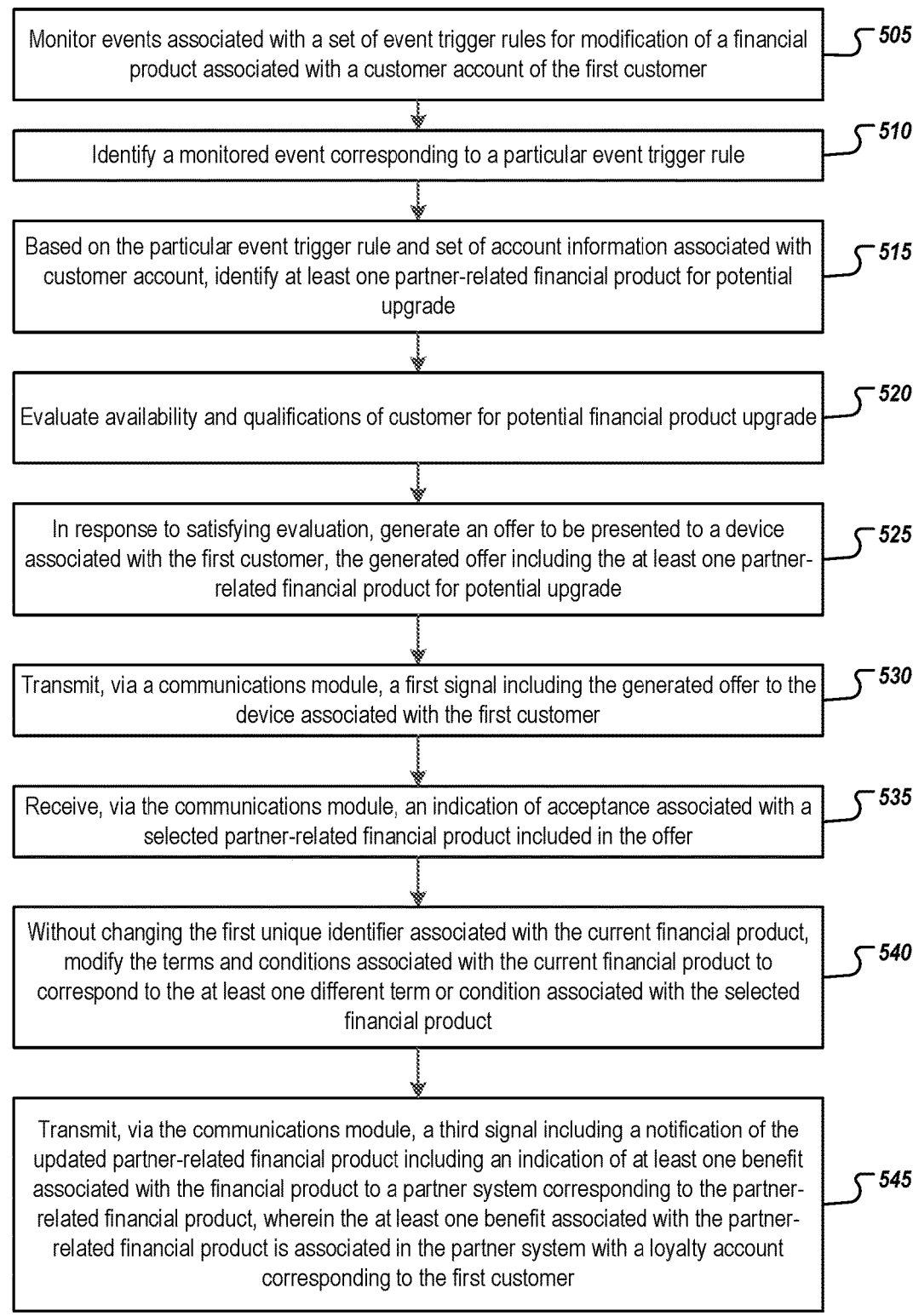
FIG. 5 is a flow chart diagram of an example method for automatically modifying a payment instrument type of a user without modifying a payment instrument identifier, wherein the payment instrument type is associated with additional benefits that can immediately be used with the partner system upon acceptance at the financial institution.

FIG. 5 is a flow chart diagram of an example method for automatically modifying a payment instrument type of a user without modifying a payment instrument identifier, wherein the payment instrument type is associated with additional benefits that can immediately be used with the partner system upon acceptance at the financial institution. For clarity of presentation, the description that follows generally describes method 500 in the context of the system 400 illustrated in FIG. 4. However, it will be understood that method 500 may be performed, for example, by any other suitable system, environment, software, and hardware, or a combination of systems, environments, software, and hardware as appropriate. In some instances, method 500 can be performed by the card modification system 402, or portions thereof, described in FIG. 4, as well as other components or functionality described in other portions of this description.

In one instance, method 500 describes a method performed within a system of a financial institution or card provider comprising a communications module, at least one memory, and at least one hardware processor interoperably coupled with the at least one memory and the communications module. The at least one memory can include a repository storing a plurality of account profiles for one or more customers, as well as a repository storing data associated with and defining a plurality of financial products offered by the financial institution or card provider. At least some of those financial products may be partner-related, in that the cards are associated with the partner system, such as in a co-branding agreement. Different levels and tiers of partner-related cards can be available, with different cards offering different levels of benefits, and with some cards being associated with fees and other card-specific terms. Further, each of the account profiles for the one or more customers can be associated with at least one current financial product (e.g., the current financial product), where the current financial product is associated with or identified by a unique identifier. The unique identifier may be a card number or primary account number (PAN) for a payment card in some instances. The unique identifier is meant to be used in transactions using the current financial product, and can uniquely identify the particular card and account, which is used in a transaction. Each of the financial products, including the current financial product, may be associated with a set of terms and conditions, which can include one or more benefits associated with ownership of the card and that relates to the partner system. The memory may also store instructions that instruct the at least one hardware processor to perform particular operations.

Turning to method 500, at 505 a triggering event initiating a financial product analysis for a first customer is identified. The financial product analysis that is triggered can be used to determine whether at least one of the financial products from the repository of financial products are to be offered as a replacement of the current financial product associated with the first customer.

In some instances, one or more events, actions, transactions, or combinations thereof may be associated with the triggering event. In some instances, the triggering event may be a determination that the first customer initiates a transaction that exceeds a transaction threshold amount. In some instances, that transaction may be associated with a particular retailer, including where the particular retailer is associated with at least one of the plurality of financial products different from the current financial product used in the transaction. In some instances, that retailer-associated financial product may provide benefits when used at the retailer, including interest-free transactions over a period of time, additional loyalty or reward points for purchases, cash back or discounts on particular transactions, or other suitable benefits. In some instances, if the retailer-associated financial product is eventually selected, a current transaction and/or at least one prior transaction may be retroactively associated with the benefits of the retailer-associated financial product, including by providing specific credit terms associated with the financial product, allowing particular rewards to be earned for those prior transactions, as well as other retroactive benefits.

At 505, events associated with a set of event trigger rules are monitored, where the event trigger rules are used to identify potential events and actions that may be related to a modification of a current financial product associated with a customer account for a first customer. The events being monitored may be customer-specific, or they may be generally monitored for a plurality of customers and can be determined, upon identification, whether they are associated with a particular event or action of the customer. In some instances, the event trigger rules may be active in response to an earlier event or transaction, such as a transaction associated with a hold for a hotel or a flight. In response to those transactions, one or more relevant event triggers may be active, such as determinations specific to a customer's location, such as where the customer, or a user device associated with the customer, is located at an airport associated with the flight reservation or a hotel at which the reservation is associated. Alternatively, based on a prior reservation, such as for a flight, information about that flight may be monitored near the time of the flight, such that any delays or flight-related information may be used as a potential event trigger to determine whether a card upgrade should be presented.

At 510, a monitored event corresponding to a particular event trigger rule can be identified. As noted, that event may be specific to the customer (e.g., arriving at a location associated with an event trigger rule for which location is a factor), may be associated with a carrier or provider associated with a prior or current transaction (e.g., a flight delay, change of gate, non-automatic upgraded room not available, etc.), or may be based on an action or transaction performed by the customer.

At 515, based on the particular event trigger rule and a set of account information associated with the customer, at least one partner-related financial product (e.g., an upgraded credit card) can be identified for a potential upgrade. In some instances, an analysis of the current financial product (e.g., partner credit card) can be performed to determine if upgrades are available. If the highest card is already held, or no additional cards are available, the process can end. If one or more upgrades, or alternative cards, are available, process 500 can continue to determine whether a particular product is to be offered.

At 520, an evaluation of the upgrade for the customer can be evaluated. In some instances, a soft analysis of a customer account and the at least one potential upgraded financial product can be performed to determine whether the customer qualifies for the financial product, such as by reviewing credit scores, credit history, an existing account history, and other requirements of the upgraded product. In some instances, prior authorization for one or more upgraded products may be performed when the event trigger rules are activated and/or prior to monitoring for particular events. In those cases, once the event trigger rule is satisfied, then it is determined that the offer can be made. Similarly, a customer evaluation can be pre-performed to determine whether they are a fit for one or more of the upgrades. If determined not to be fit for those products, or it is determined that the current product of the customer is a better fit, those other products may not be offered.

In response to satisfying the evaluation for at least one of the upgraded cards, an offer is generated at 525 to be presented to a device associated with the first customer, where the generated offer includes the at least one partner-related financial product as a potential upgrade. The card modification system 402, for example, can generate an offer for presentation to the client through a suitable interface and can include the particular products identified at 615 to the client for review. The offer may include highlighted benefits of the potential cards based on the performed analysis, including those that may be of immediate interest and applicability. In some instances, the offer may also include or link to one or more of the terms or conditions of the particular cards included in the offer. In some instances, the offer may embed, link, or otherwise include mechanisms to allow the customer to select, via a user interface, particular cards for card modification. In some instances, a chart or illustration comparing the possible replacement cards to the current card may be included in the offer.

At 530, a first signal including the generated offer can be transmitted, via a communications module, to a device associated with the first customer. The device may be a mobile device associated with the customer account of the first customer, such as a smartphone or tablet. Alternatively, the device may be a registered laptop or desktop computer of the first customer. In still other instances, the device may be a point-of-sale or display at a merchant where the first customer is performing a transaction. For example, if the offer is for a branded credit card at a particular retailer and is offered in response to a transaction at that retailer, the new branded credit card may be included in the offer and presented at the point-of-sale during the transaction. In some instances, the offer may include a set of terms and conditions associated with each of the financial products. The set of terms and conditions may be a link to review the specific terms and conditions. In some instances, only the terms and conditions which differ from those of the current financial product's terms and conditions may be included or presented. In still other instances, only a high-level indication of the particular benefits of the potential financial product may be presented, with the terms and conditions being presented after a particular product is selected. Further, any immediately redeemable benefits can be presented and made immediately available upon acceptance.

At 535, an indication of acceptance associated with a selected financial product from the set of potential financial products included in the offer can be received via the communications module in a second signal. The indication may be associated with an explicit user selection via a user interface at a display or screen at which the generated offer was presented after 530. In some instances, a full set of terms and disclosures associated with the selected financial product may not have been provided to and explicitly accepted by the first customer. In those instances, the full set of terms and disclosures associated with the selected financial product can be identified and transmitted to the device associated with the first customer for review and acceptance. Any such presentation of the terms and conditions is subject to governing law and regulations, and the presentation or device-side application through which the presentation is made can ensure that all such laws and regulations are followed.

In response to receiving the acceptance of the selected financial product, method 500 continues at 540. At 540, the terms and conditions associated with the current financial product are modified to correspond to the at least one different term or condition associated with the selected financial product. Importantly, the first unique identifier associated with the current financial product is not changed or modified at 540, such that the modified financial product retains the exact same first unique identifier. In doing so, transactions may still be executed using the existing financial product, although how those transactions are processed may differ based on the updated terms and conditions. In some instances, and similar to 335 of FIG. 3, at least one term or condition associated with the selected financial product can be identified as different from an existing term or condition associated with the current financial product being replaced or modified. In some instances, a comparison analysis may be performed, or the differences may have already been identified in generating the offer and/or at another time. Based on those determined differences, the terms and conditions associated with the current financial product are modified to correspond to the at least one different term or condition associated with the selected financial product at 540.

In some instances, after the terms and conditions are modified using the modification process, and where the financial product is a payment card or related financial product associated with a physical card or instrument, a process for generating a new physical financial product or payment card can be initiated or otherwise triggered. The new physical product or card can reflect any new branding associated with the selected financial product but will retain the first unique identifier. In some instances, updated security information and expiration dates can be added to the newly generated card. Once generated, the card can be sent to an address or location at which the first customer is associated.

At 545, a third signal including a notification of the updated partner-related financial product can be transmitted, via the communications module, to a corresponding partner system corresponding to the upgraded partner-related financial product. In particular, any upgraded benefits corresponding to the upgrade product can be transmitted to the partner system as associated with the customer's account. In doing so, the customer's account and upgraded financial product can be linked to the customer's loyalty account at the partner system, and any associated benefits of the new financial product can be updated at the partner for immediate use. In some instances, the third signal may include an identification of a customer account, a corresponding loyalty account stored at or associated with the customer account, and information related to the changes in the benefits, including any newly added and/or removed benefits associated with the accepted and updated financial product. As described in FIG. 4, any suitable API or communication technique can be used to provide the information to the partner system to allow for immediate updating of the loyalty account, thereby allowing the customer to obtain all benefits in real- or near-real-time at the partner system.

For example, if the new financial product is a black card providing premium lounge access, by the time the customer arrives at the lounge, assuming the offer is made upon arrival to the airport or while sitting in a general area, the benefits may already be active and the customer can seamlessly access the premium lounge. Similarly, if the new financial product relates to upgrades at a hotel, the offer may be triggered when the customer arrives near the hotel. Upon acceptance, the information may be shared with the hotel's system, such that upon check-in, an upgraded room may be automatically applied to the customer's check-in.

Figure 6:
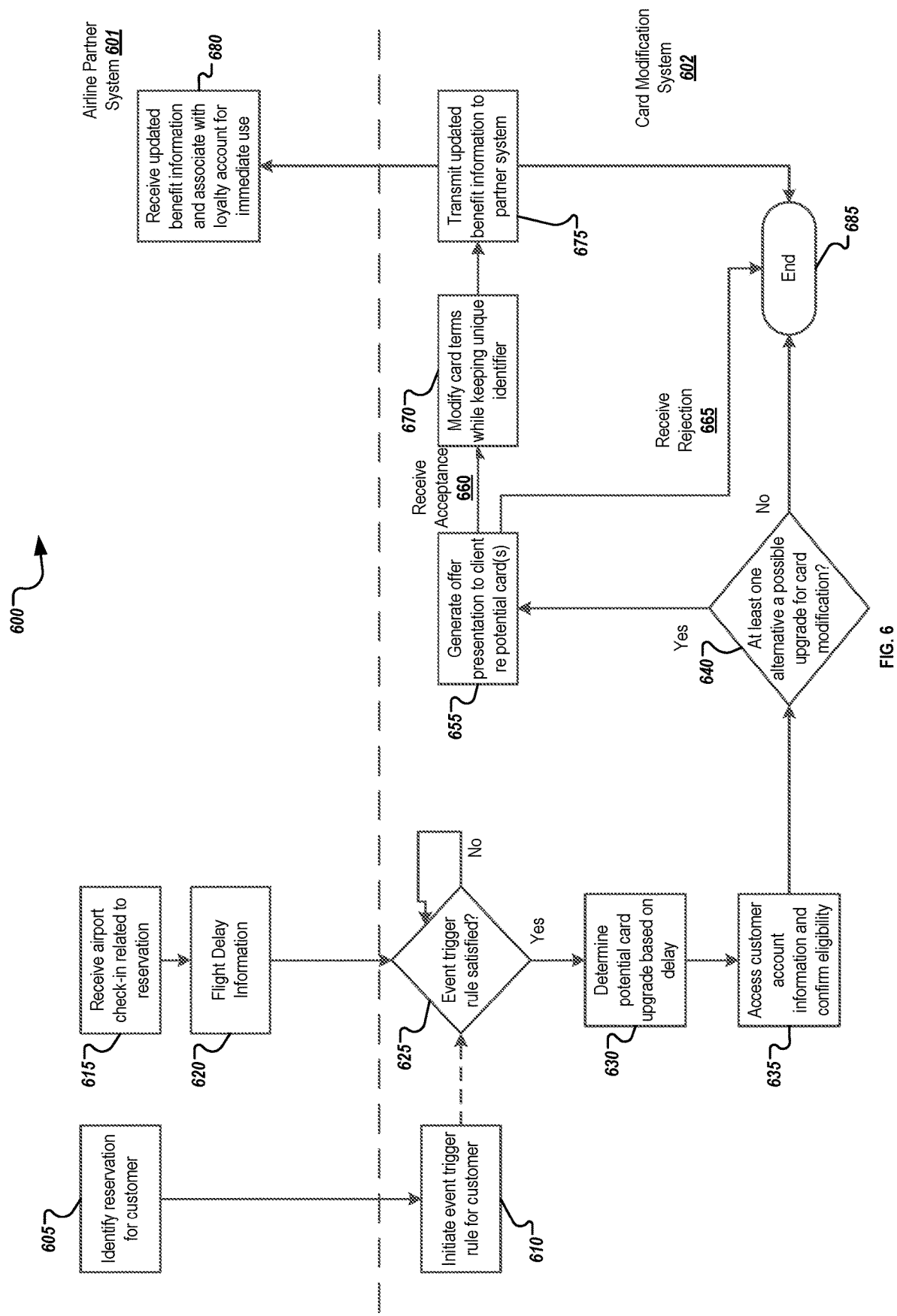
FIG. 6 illustrates an example use case related to an airline-related partner card upgrade process in response to airline-related events and a customer analysis.

FIG. 6 illustrates an example use case related to an airline-related partner card upgrade process in response to airline-related events and a customer analysis.

At 605, a reservation for a customer associated with an airline partner system 601 is identified. The reservation may be identified based on a transaction associated with a financial system, or information about the reservation may be identified at the airline partner system 601. In response to the reservation, at 610, one or more event trigger rules for the customer can be initiated such that related events are monitored by the card modification system 602. In some instances, one such rule may be monitoring flight information to determine if the customer's flight is delayed or otherwise changed.

At 615, the partner system 601 may determine that the customer has checked-in at the airport in relation to the particular reservation. In some instances, that information alone may be enough to trigger a particular event trigger rule. In other instances, additional updates may be required to trigger the upgrade process, such as receiving flight delay information at 620 indicating that the customer's flight may be delayed or otherwise modified.

In response to receiving that information, the card modification system 602 can determine whether one of the event trigger rules are satisfied at 625. If not, the analysis of whether the event trigger is satisfied continues. If, however, a particular event trigger is satisfied, at 630 a determination of potential card upgrades based on the event trigger rule are identified. In some instances, at 635, customer account information can be accessed and analyzed to confirm customer eligibility for the potential upgraded card. In some instances, determining if a potential upgrade is available is based on the type of event trigger rule that is satisfied. For example, if a flight delay is received, a card related to additional points per dollar spent may not be relevant. Instead, a card associated with upgrade lounge benefits may associated with the event trigger. Eligibility analyses may evaluate whether the customer satisfies the requirements for a particular upgrade card or cards, and may include credit score evaluations, credit and account history analyses, as well as a determination of whether the customer is willing to pay an additional fee for the upgraded card.

At 640, a determination is made as to whether at least one potential card upgrade is available or identified. If not, method 600 ends at 685. If so, however, an offer is generated for presentation to the customer regarding the potential upgrade cards at 655. The presentation may be similar to the presentations described herein, and can provide benefit information about what may be gained by selecting a particular card, as well as any particular terms and requirements that must also be met. If no particular upgrade is selected (665), method 600 ends at 680. If a particular upgrade is accepted (660), method 600 continues at 670, where the card terms can be modified to the new upgrade card while keeping the unique identifier the same as the current card. Additionally, the card modification system 602 can transmit the updated benefit information to the partner system at 675. The updated benefit information, as shown, is received at 680 by the airline partner system 601, and can be associated with the partner system's loyalty account associated with the customer. In doing so, the upgraded benefits associated with the new card can be immediately updated at the partner system 601, and can be used by the customer as they arrive at the lounge or otherwise attempt to use the benefits. No new physical card is needed, and the airline partner system 601 can update its records and accounts based on the upgrade confirmation from the card modification system 602. After transmitting the benefit information to the partner system 601, the process 600 can end at 685.

Similar solutions can be implemented in any partner-related system, including hotel systems, restaurant partners, retail partners, and others. When the suitable event trigger is satisfied, the upgrade analysis can determine if one or more upgraded partner cards are available and should be offered to the customer. In response to an offer of a particular card being accepted, customers can accept and immediately begin use of those rewards through the normal course of business as a result of the communication between the financial institution and the partner system.

The preceding figures and accompanying description illustrate example processes and computer-implementable techniques. However, systems 100 and/or 400 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications interface;
   at least one memory storing instructions, a repository storing a plurality of account profiles, and a repository storing data associated with a plurality of partner-related financial products, each account profile associated with a particular customer and associated with at least one current partner-related financial product having a unique identifier associated with the at least one current partner-related financial product, each partner-related financial product associated with a set of terms and conditions, the terms and conditions including at least one benefit associated with a partner system corresponding to the partner-related financial products;
   at least one hardware processor interoperably coupled with the at least one memory and the communications interface, wherein the instructions instruct the at least one hardware processor to:
     identify at least one triggering event rule for initiating a financial product analysis based on monitoring of at least one event source associated with the partner system for a first customer, wherein the financial product analysis determines whether at least one of the plurality of partner-related financial products is to be offered as a replacement to the at least one current partner-related financial product associated with the first customer;

monitor at least one event source for events associated with the at least one identified triggering event rule, wherein the at least one event source is associated with the partner system, and wherein the events represent partner-related transactions;

in response to identifying an event associated with the at least one identified triggering event rule based on the monitoring of the at least one event source associated with the partner system, access an account profile associated with the first customer to identify account information associated with the first customer;

compare, automatically without user input, the account information associated with the first customer with the plurality of partner-related financial products to automatically identify at least one potential partner-related financial product to be offered to the first customer, wherein the at least one potential partner-related financial product to be offered is associated with a benefit corresponding to the identified event;

in response to automatically identifying the at least one potential partner-related financial product to be offered to the first customer:
  generate an offer to be presented at a user interface of a device associated with the first customer, the generated offer including the at least one identified potential partner-related financial product, wherein acceptance of the generated offer causes automatic modification of the terms or conditions associated with the at least one current financial product to the terms and conditions associated with at least one identified potential partner-related financial product without changing the unique identifier associated with the at least one current product being modified and without requiring issuance of a new physical card; and
  transmit, via the communications interface, a first signal including the generated offer to the device;

receive an indication of acceptance associated with a particular partner-related financial product from the device associated with the first customer, the indication of acceptance received based on an explicit user selection via the user interface of the device associated with the first customer; and in response to receiving the indication of acceptance, automatically modify the terms or conditions associated with the at least one current financial product to the terms or conditions of the particular partner-related financial product without changing the unique identifier associated with the at least one current product being modified and without requiring issuance of a new physical card.

2. The system of claim 1, wherein
receiving the indication of acceptance associated with the particular partner-related financial product from the device associated with the first customer comprises receiving, via the communications interface, a second signal including the indication of acceptance associated with the particular partner-related financial product selected from the at least one potential partner-related financial products for replacing the current partner-related financial product associated with the first customer; and
automatically modifying the terms or conditions associated with the at least one current financial product to the terms or conditions of the particular partner-related financial product comprises:
  identifying at least one term or condition associated with the particular partner-related financial product different than terms or conditions associated with the at least one current financial product, the at least one term or condition including a change to at least one benefit associated with the partner system;
  automatically modifying the terms and conditions associated with the at least one current financial product associated with the first customer to correspond with the at least one different identified term or condition associated with the particular financial product, wherein modifying the terms or conditions associated with the at least one current financial product does not change the unique identifier associated with the at least one current financial product being modified and does not require issuance of a new physical card; and
the instructions instruct the at least one hardware processor to:
  transmit, via the communication interface, a third signal including an indication of at least one updated benefit associated with the partner system, the at least one updated benefit associated with the particular partner-related financial product.

3. The system of claim 1, wherein identifying the at least one potential partner-related financial product to be offered to the first customer comprises:
identifying a particular trigger event rule triggered in response to monitoring the events and a detected occurrence of a partner-specific event;
determining, from the plurality of partner-related financial products, at least one partner-related financial product associated with the partner-specific event;
identifying a set of customer requirements associated with each of the at least one partner-related financial products;
determining, for each of the at least one partner-related financial product associated with the partner-specific event, whether the identified set of customer requirements are met by the first customer based on the account information associated with the first customer; and
in response to determining that the identified set of customer requirements are met by the first customer for a particular partner-related financial product, including the particular partner-related financial product in the at least one potential partner-related financial product to be offered to the first customer.

4. The system of claim 3, wherein the first customer is associated with a future event associated with the partner system, and wherein identifying at least one triggering event rule for initiating a financial product analysis for the first customer comprises identifying at least one future transaction from the account information associated with the first customer associated with a triggering event rule, and wherein identifying an event associated with the at least one identified triggering event rule comprises identifying an event from the partner system associated with the future transaction.

5. The system of claim 4, wherein identifying the event associated with the at least one identified triggering event rule further comprises, in addition to identifying the event from the partner system, identifying a location of the first customer corresponding to a location at which execution of the at least one future transaction is scheduled to occur.

6. The system of claim 5, wherein the at least one future transaction comprises a scheduled reservation for a flight with an airline, wherein the identified event from the partner system associated with the future transaction comprises a flight delay associated with the scheduled reservation, and wherein the location of the first customer is at an airport from which the flight associated with scheduled reservation is to depart.

7. The system of claim 2, wherein the current financial product is associated with a first partner-branded payment card, and wherein the selected financial product is associated with a second partner-branded payment card different than the first partner-branded payment card, wherein the instructions instruct the at least one hardware processor to:
after modifying the terms and conditions associated with the at least one current financial product, initiate generation of a new physical payment card corresponding to the second partner-branded payment card, wherein the unique identifier associated with the current partner-related financial product is the same for the new physical payment card.

8. The system of claim 2, wherein the indication of at least one updated benefit associated with the partner system includes:
the unique identifier associated with the at least one current product being modified;
a loyalty account at the partner system associated with the unique identifier; and
the at least one updated benefit associated with the particular partner-related product.

9. A non-transitory, computer-readable medium storing computer-readable instructions executable by a computer and configured to instruct the computer to:
identify at least one triggering event rule for initiating a financial product analysis for a first customer from a plurality of customers, each of the plurality of customers associated with an account profile, each account profile associated with a particular customer and associated with at least one current partner-related financial product having a unique identifier associated with the at least one current partner-related financial product, each partner-related financial product associated with a set of terms and conditions, the terms and conditions including at least one benefit associated with a partner system corresponding to the partner-related financial products, wherein the financial product analysis determines whether at least one of a plurality of partner-related financial products is to be offered as a replacement to at least one current partner-related financial product associated with the first customer;
monitor at least one event source for events associated with the at least one identified triggering event rule, wherein the at least one event source is associated with the partner system, and wherein the events represent partner-related transactions;
in response to identifying an event associated with the at least one identified triggering event rule based on the monitoring of the at least one event source associated with the partner system, access an account profile associated with the first customer to identify account information associated with the first customer;
compare, automatically without user input, the account information associated with the first customer with the plurality of partner-related financial products to automatically identify at least one potential partner-related financial product to be offered to the first customer, wherein the at least one potential partner-related financial product to be offered is associated with a benefit corresponding to the identified event; and
in response to automatically identifying the at least one potential partner-related financial product to be offered to the first customer:
generate an offer to be presented at a user interface of a device associated with the first customer, the generated offer including the at least one identified potential partner-related financial product, wherein acceptance of the generated offer causes automatic modification of the terms or conditions associated with the at least one current financial product to the terms and conditions associated with at least one identified potential partner-related financial product without changing the unique identifier associated with the at least one current product being modified and without requiring issuance of a new physical card; and
transmit, via a communications interface, a first signal including the generated offer to the device;
receive an indication of acceptance associated with a particular partner-related financial product from the device associated with the first customer, the indication of acceptance received based on an explicit user selection via the user interface of the device associated with the first customer; and
in response to receiving the indication of acceptance, automatically modify the terms or conditions associated with the at least one current financial product to the terms or conditions of the particular partner-related financial product without changing the unique identifier associated with the at least one current product being modified and without requiring issuance of a new physical card.

10. The non-transitory, computer-readable medium of claim 9, wherein:
receiving the indication of acceptance associated with the particular partner-related financial product from the device associated with the first customer comprises receiving, via the communications interface, a second signal including the indication of acceptance associated with the particular partner-related financial product selected from the at least one potential partner-related financial products for replacing the current partner-related financial product associated with the first customer; and
automatically modifying the terms or conditions associated with the at least one current financial product to the terms or conditions of the particular partner-related financial product comprises:
identifying at least one term or condition associated with the particular partner-related financial product different than terms or conditions associated with the at least one current financial product, the at least one term or condition including a change to at least one benefit associated with the partner system;
automatically modifying the terms and conditions associated with the at least one current financial product associated with the first customer to correspond with the at least one different identified term or condition associated with the particular financial product, wherein modifying the terms or conditions associated with the at least one current financial product does not change the unique identifier associated with the at least one current financial product being modified and does not require issuance of a new physical card; and the instructions instruct the computer to:
transmit, via the communication interface, a third signal including an indication of at least one updated benefit associated with the partner system, the at least one updated benefit associated with the particular partner-related financial product.

11. The non-transitory, computer-readable medium of claim 9, wherein identifying the at least one potential partner-related financial product to be offered to the first customer comprises:
identifying a particular trigger event rule triggered in response to monitoring the events and a detected occurrence of a partner-specific event;
determining, from the plurality of partner-related financial products, at least one partner-related financial product associated with the partner-specific event;
identifying a set of customer requirements associated with each of the at least one partner-related financial products;
determining, for each of the at least one partner-related financial product associated with the partner-specific event, whether the identified set of customer requirements are met by the first customer based on the account information associated with the first customer; and
in response to determining that the identified set of customer requirements are met by the first customer for a particular partner-related financial product, including the particular partner-related financial product in the at least one potential partner-related financial product to be offered to the first customer.

12. The non-transitory, computer-readable medium of claim 11, wherein the first customer is associated with a future event associated with the partner system, and wherein identifying at least one triggering event rule for initiating a financial product analysis for the first customer comprises identifying at least one future transaction from the account information associated with the first customer associated with a triggering event rule, and wherein identifying an event associated with the at least one identified triggering event rule comprises identifying an event from the partner system associated with the future transaction.

13. The non-transitory, computer-readable medium of claim 12, wherein identifying the event associated with the at least one identified triggering event rule further comprises, in addition to identifying the event from the partner system, identifying a location of the first customer corresponding to a location at which execution of the at least one future transaction is scheduled to occur.

14. The non-transitory, computer-readable medium of claim 13, wherein the at least one future transaction comprises a scheduled reservation for a flight with an airline, wherein the identified event from the partner system associated with the future transaction comprises a flight delay associated with the scheduled reservation, and wherein the location of the first customer is at an airport from which the flight associated with scheduled reservation is to depart.

15. The non-transitory, computer-readable medium of claim 10, wherein the current financial product is associated with a first partner-branded payment card, and wherein the selected financial product is associated with a second partner-branded payment card different than the first partner-branded payment card, wherein the instructions instruct the computer to:
after modifying the terms and conditions associated with the at least one current financial product, initiate generation of a new physical payment card corresponding to the second partner-branded payment card, wherein the unique identifier associated with the current partner-related financial product is the same for the new physical payment card.

16. The non-transitory, computer-readable medium of claim 10, wherein the indication of at least one updated benefit associated with the partner system includes:
the unique identifier associated with the at least one current product being modified;
a loyalty account at the partner system associated with the unique identifier; and
the at least one updated benefit associated with the particular partner-related product.

17. A computerized method performed by one or more processors, the method comprising:
identify at least one triggering event rule for initiating a financial product analysis for a first customer from a plurality of customers, each of the plurality of customers associated with an account profile, each account profile associated with a particular customer and associated with at least one current partner-related financial product having a unique identifier associated with the at least one current partner-related financial product, each partner-related financial product associated with a set of terms and conditions, the terms and conditions including at least one benefit associated with a partner system corresponding to the partner-related financial products, wherein the financial product analysis determines whether at least one of a plurality of partner-related financial products is to be offered as a replacement to at least one current partner-related financial product associated with the first customer;
monitoring at least one event source for events associated with the at least one identified triggering event rule, wherein the at least one event source is associated with the partner system, and wherein the events represent partner-related transactions;
in response to identifying an event associated with the at least one identified triggering event rule based on the monitoring of the at least one event source associated with the partner system, accessing an account profile associated with the first customer to identify account information associated with the first customer;
comparing, automatically without user input, the account information associated with the first customer with the plurality of partner-related financial products to automatically identify at least one potential partner-related financial product to be offered to the first customer, wherein the at least one potential partner-related financial product to be offered is associated with a benefit corresponding to the identified event; and
in response to identifying the at least one potential partner-related financial product to be offered to the first customer:
generating an offer to be presented at a user interface of a device associated with the first customer, the generated offer including the at least one identified potential partner-related financial product, wherein acceptance of the generated offer causes automatic modification of the terms or conditions associated with the at least one current financial product to the terms and conditions associated with at least one identified potential partner-related financial product without changing the unique identifier associated with the at least one current product being modified; and transmitting, via a communications interface, a first signal including the generated offer to the device;

receiving an indication of acceptance associated with a particular partner-related financial product from the device associated with the first customer, the indication of acceptance received based on an explicit user selection via the user interface of the device associated with the first customer; and in response to receiving the indication of acceptance, automatically modifying the terms or conditions associated with the at least one current financial product to the terms or conditions of the particular partner-related financial product without changing the unique identifier associated with the at least one current product being modified and without requiring issuance of a new physical card.

18. The computerized method of claim 17, the method comprising:

receiving, via the communications interface, a second signal including an indication of acceptance associated with a particular partner-related financial product selected from the at least one potential partner-related financial products for replacing the current partner-related financial product associated with the first customer;

identifying at least one term or condition associated with the particular partner-related financial product different than terms or conditions associated with the at least one current financial product, the at least one term or condition including a change to at least one benefit associated with the partner system;

automatically modifying the terms and conditions associated with the at least one current financial product associated with the first customer to correspond with the at least one different identified term or condition associated with the particular financial product, wherein modifying the terms or conditions associated with the at least one current financial product does not change the unique identifier associated with the at least one current financial product being modified; and transmitting, via the communication interface, a third signal including an indication of at least one updated benefit associated with the partner system, the at least one updated benefit associated with the particular partner-related financial product.

19. The computerized method of claim 17, wherein identifying the at least one potential partner-related financial product to be offered to the first customer comprises:

identifying a particular trigger event rule triggered in response to monitoring the events and a detected occurrence of a partner-specific event;

determining, from the plurality of partner-related financial products, at least one partner-related financial product associated with the partner-specific event;

identifying a set of customer requirements associated with each of the at least one partner-related financial products;

determining, for each of the at least one partner-related financial product associated with the partner-specific event, whether the identified set of customer requirements are met by the first customer based on the account information associated with the first customer; and in response to determining that the identified set of customer requirements are met by the first customer for a particular partner-related financial product, including the particular partner-related financial product in the at least one potential partner-related financial product to be offered to the first customer.

20. The computerized method of claim 19, wherein the first customer is associated with a future event associated with the partner system, and wherein identifying at least one triggering event rule for initiating a financial product analysis for the first customer comprises identifying at least one future transaction from the account information associated with the first customer associated with a triggering event rule, and wherein identifying an event associated with the at least one identified triggering event rule comprises identifying an event from the partner system associated with the future transaction.

* * * * *